United States Patent
Wu

(10) Patent No.: US 11,867,947 B2
(45) Date of Patent: Jan. 9, 2024

(54) CABLE ASSEMBLY HAVING ROUTABLE SPLICE PROTECTORS

(71) Applicant: CORNING RESEARCH & DEVELOPMENT CORPORATION, Corning, NY (US)

(72) Inventor: Qi Wu, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/723,774

(22) Filed: Apr. 19, 2022

(65) Prior Publication Data

US 2022/0350081 A1    Nov. 3, 2022

Related U.S. Application Data

(60) Provisional application No. 63/182,062, filed on Apr. 30, 2021.

(51) Int. Cl.
| | |
|---|---|
| G02B 6/38 | (2006.01) |
| G02B 6/44 | (2006.01) |
| G02B 6/255 | (2006.01) |
| G02B 6/02 | (2006.01) |
| G02B 6/25 | (2006.01) |

(52) U.S. Cl.
CPC ....... G02B 6/2558 (2013.01); G02B 6/02395 (2013.01); G02B 6/25 (2013.01)

(58) Field of Classification Search
CPC ..... G02B 6/02395; G02B 6/25; G02B 6/2558
See application file for complete search history.

(56) References Cited

U.S. PATENT DOCUMENTS

| | | | |
|---|---|---|---|
| 4,018,983 A | 4/1977 | Pedlow | |
| 4,077,702 A | 3/1978 | Kunze et al. | |
| 4,254,865 A | 3/1981 | Pacey et al. | |
| 4,404,010 A | 9/1983 | Bricheno et al. | |
| 4,509,820 A * | 4/1985 | Murata | G02B 6/2558 |
| | | | 219/544 |
| 4,537,468 A | 8/1985 | Degoix et al. | |
| 4,714,316 A | 12/1987 | Moore et al. | |
| 4,778,242 A | 10/1988 | Ota et al. | |
| 4,786,138 A | 11/1988 | Buckley | |
| 4,812,010 A | 3/1989 | Osaka et al. | |
| 4,865,411 A | 9/1989 | Darsey et al. | |
| 4,878,732 A | 11/1989 | Rohner et al. | |
| 4,923,274 A | 5/1990 | Dean | |

(Continued)

FOREIGN PATENT DOCUMENTS

| | | |
|---|---|---|
| CN | 1548492 A | 11/2004 |
| CN | 1735825 A | 2/2006 |

(Continued)

OTHER PUBLICATIONS

Duke et al; "Benefits of CO2 Laser Heating for High Reliability Fiber Splicing," Proc. SPIE 735, pp. B1-B12, 2016.
Friebele et al; "Method for Recoating Optical Fibres With Polyimide," Electron. Lett, 34, pp. 1249-1250, 1998.

(Continued)

*Primary Examiner* — Ryan A Lepisto

(57) ABSTRACT

The present disclosure relates to various types of optical fibers that are spliced together with a splice protector provided to house the spliced optical fibers. The splice protector has dimensions that enable improved mechanical properties of the spliced optical fiber.

13 Claims, 17 Drawing Sheets

(56) References Cited

U.S. PATENT DOCUMENTS

| | | | |
|---|---|---|---|
| 5,022,735 A * | 6/1991 | Dahlgren | G02B 6/2558 156/48 |
| 5,093,048 A | 3/1992 | Kagan | |
| 5,212,756 A | 5/1993 | Foll | |
| 5,231,688 A | 7/1993 | Zimmer | |
| 5,247,598 A | 9/1993 | Takimoto et al. | |
| 5,360,464 A | 11/1994 | Yamauchi et al. | |
| 5,367,591 A | 11/1994 | Seike et al. | |
| 5,416,873 A | 5/1995 | Huebscher et al. | |
| 5,477,507 A | 12/1995 | Kaplan | |
| 5,644,670 A | 7/1997 | Fukuda et al. | |
| 5,682,454 A | 10/1997 | Gaillard | |
| 5,720,908 A | 2/1998 | Gaillard | |
| 5,731,051 A | 3/1998 | Fahey et al. | |
| 5,832,162 A | 11/1998 | Sarbell | |
| 6,099,170 A | 8/2000 | Sarbell | |
| 6,152,611 A | 11/2000 | Mardirossian et al. | |
| 6,269,210 B1 | 7/2001 | Yagi et al. | |
| 6,282,353 B1 | 8/2001 | Clark | |
| 6,295,400 B1 | 9/2001 | Shahid | |
| 6,360,044 B1 | 3/2002 | Mills et al. | |
| 6,367,990 B1 | 4/2002 | Dumitriu | |
| 6,421,493 B1 | 7/2002 | Burek et al. | |
| 6,454,471 B1 | 9/2002 | Ware et al. | |
| 6,485,199 B1 | 11/2002 | Ware et al. | |
| 6,614,971 B2 | 9/2003 | Sun et al. | |
| 6,623,181 B1 * | 9/2003 | Daems | G02B 6/2558 385/99 |
| 6,676,299 B1 | 1/2004 | Durrant et al. | |
| 6,701,054 B1 | 3/2004 | Urruti | |
| 6,728,451 B2 | 4/2004 | Kordahi | |
| 6,738,555 B1 | 5/2004 | Cooke et al. | |
| 6,742,705 B1 | 6/2004 | Clark | |
| 6,771,961 B2 | 8/2004 | Bamburak et al. | |
| 6,869,227 B2 | 3/2005 | Del et al. | |
| 7,118,035 B2 | 10/2006 | Clark | |
| 7,181,111 B2 | 2/2007 | Ahrens | |
| 7,364,375 B1 | 4/2008 | Jones | |
| 7,461,981 B2 | 12/2008 | Yow et al. | |
| 7,717,623 B2 | 5/2010 | Ohtsuka et al. | |
| 7,865,044 B2 * | 1/2011 | Farhadiroushan | G02B 6/4436 385/12 |
| 7,901,147 B1 | 3/2011 | De et al. | |
| 7,903,925 B2 | 3/2011 | Cooke et al. | |
| 8,047,726 B2 | 11/2011 | Tamekuni et al. | |
| 8,096,712 B2 | 1/2012 | Solomon et al. | |
| 8,388,242 B2 | 3/2013 | Kachmar et al. | |
| 8,408,811 B2 | 4/2013 | De et al. | |
| 8,408,818 B2 | 4/2013 | Homma | |
| 8,542,971 B2 * | 9/2013 | Chatigny | H01S 3/06704 385/134 |
| 8,548,294 B2 | 10/2013 | Toge et al. | |
| 8,573,855 B2 | 11/2013 | Nhep | |
| 8,678,670 B2 | 3/2014 | Takahashi et al. | |
| 8,696,221 B2 | 4/2014 | Vastmans et al. | |
| 8,702,326 B2 * | 4/2014 | Faulkner | G02B 6/2553 385/98 |
| 8,740,479 B2 | 6/2014 | Shitama et al. | |
| 8,824,841 B1 | 9/2014 | Mullen | |
| 8,915,659 B2 | 12/2014 | Marcouiller et al. | |
| 8,944,411 B2 | 2/2015 | Cooke et al. | |
| 8,958,673 B2 | 2/2015 | Cline et al. | |
| 9,063,286 B2 | 6/2015 | Durrant et al. | |
| 9,089,931 B1 | 7/2015 | Carberry et al. | |
| 9,167,626 B1 | 10/2015 | Wu | |
| 9,360,624 B2 | 6/2016 | Faulkner et al. | |
| 9,372,309 B2 * | 6/2016 | Ferrari | H02G 15/18 |
| 9,389,382 B2 | 7/2016 | Blazer et al. | |
| 9,604,261 B2 | 3/2017 | Wu | |
| 9,857,548 B2 | 1/2018 | Nielsen et al. | |
| 9,933,572 B2 | 4/2018 | Akiyama et al. | |
| 9,939,599 B2 | 4/2018 | Blazer et al. | |
| 10,018,782 B2 | 7/2018 | Wu | |
| 10,018,798 B2 | 7/2018 | Larson et al. | |
| 10,185,110 B2 | 1/2019 | Kaneko et al. | |
| 10,209,447 B2 | 2/2019 | Filipowicz et al. | |
| 10,254,500 B2 | 4/2019 | Lu et al. | |
| 10,353,154 B2 | 7/2019 | Ott et al. | |
| 10,658,790 B2 | 5/2020 | Finona | |
| RE48,144 E | 8/2020 | Faulkner et al. | |
| 10,845,540 B2 | 11/2020 | Wang et al. | |
| 10,921,540 B2 | 2/2021 | Wu | |
| 10,976,492 B2 * | 4/2021 | Wu | G02B 6/255 |
| 11,131,811 B2 * | 9/2021 | Wu | G02B 6/2558 |
| 11,287,588 B2 * | 3/2022 | Li | G02B 6/4403 |
| 11,353,658 B2 * | 6/2022 | Wu | G02B 6/2558 |
| 2002/0003934 A1 | 1/2002 | Clark | |
| 2002/0051612 A1 | 5/2002 | Shimizu et al. | |
| 2002/0110330 A1 * | 8/2002 | Brogan | G02B 6/2558 385/95 |
| 2003/0016923 A1 | 1/2003 | Summers et al. | |
| 2003/0044141 A1 | 3/2003 | Melton et al. | |
| 2003/0103743 A1 | 6/2003 | Sun et al. | |
| 2003/0231847 A1 | 12/2003 | Varner et al. | |
| 2004/0062480 A1 | 4/2004 | Cronk et al. | |
| 2004/0218891 A1 | 11/2004 | Clark | |
| 2005/0238313 A1 | 10/2005 | Clark | |
| 2005/0271338 A1 | 12/2005 | Livingston | |
| 2006/0093281 A1 | 5/2006 | Kesler | |
| 2009/0103870 A1 | 4/2009 | Solomon et al. | |
| 2011/0085772 A1 | 4/2011 | Benjamin et al. | |
| 2011/0110635 A1 | 5/2011 | Toge et al. | |
| 2011/0286704 A1 | 11/2011 | Rubinstein et al. | |
| 2011/0311185 A1 | 12/2011 | Kachmar et al. | |
| 2011/0317966 A1 * | 12/2011 | Kumkar | G02B 6/2558 385/95 |
| 2011/0317967 A1 * | 12/2011 | Kumkar | G02B 6/2558 385/98 |
| 2012/0020630 A1 | 1/2012 | Vastmans et al. | |
| 2012/0243838 A1 | 9/2012 | Sato et al. | |
| 2012/0281951 A1 | 11/2012 | Takahashi et al. | |
| 2013/0074303 A1 | 3/2013 | Durrant et al. | |
| 2013/0251317 A1 | 9/2013 | Faulkner et al. | |
| 2013/0302003 A1 | 11/2013 | Bookbinder et al. | |
| 2014/0286615 A1 | 9/2014 | Faulkner et al. | |
| 2014/0321813 A1 | 10/2014 | Lu | |
| 2015/0110450 A1 | 4/2015 | Jones et al. | |
| 2015/0253503 A1 | 9/2015 | Saito et al. | |
| 2015/0346445 A1 | 12/2015 | Blazer et al. | |
| 2016/0116683 A1 | 4/2016 | Murashima et al. | |
| 2016/0161672 A1 | 6/2016 | Bauco et al. | |
| 2016/0299306 A1 | 10/2016 | McAlpine et al. | |
| 2016/0299310 A1 | 10/2016 | Kaneko et al. | |
| 2016/0349453 A1 | 12/2016 | Wu | |
| 2016/0370543 A1 * | 12/2016 | Ocampo | C09D 4/00 |
| 2017/0001224 A1 | 1/2017 | Wu | |
| 2017/0010433 A1 | 1/2017 | Nielsen et al. | |
| 2017/0031121 A1 | 2/2017 | Blazer et al. | |
| 2018/0011262 A1 | 1/2018 | Chabot et al. | |
| 2018/0024294 A1 | 1/2018 | Wang et al. | |
| 2018/0210152 A1 * | 7/2018 | Giotto | G02B 6/2558 |
| 2018/0351292 A1 | 12/2018 | Finona | |
| 2019/0137689 A1 | 5/2019 | Filipowicz et al. | |
| 2019/0369332 A1 | 12/2019 | Bohbot | |
| 2020/0012047 A1 | 1/2020 | Wu | |
| 2020/0012054 A1 | 1/2020 | Ott et al. | |
| 2020/0081186 A1 | 3/2020 | Wu | |
| 2021/0033793 A1 | 2/2021 | Wu | |
| 2021/0302656 A1 | 9/2021 | Wu | |
| 2022/0107462 A1 * | 4/2022 | Bastola | C03C 25/105 |

FOREIGN PATENT DOCUMENTS

| | | |
|---|---|---|
| CN | 202494801 U | 10/2012 |
| CN | 105717576 A | 6/2016 |
| DE | 202007013173 U1 | 12/2007 |
| EP | 0057828 A1 | 8/1982 |
| EP | 0278423 A2 | 8/1988 |
| EP | 0537413 A1 | 4/1993 |
| EP | 1168018 A2 | 1/2002 |
| EP | 3229051 A1 | 10/2017 |
| JP | 55-103513 A | 8/1980 |
| JP | 55-129305 A | 10/1980 |

(56) References Cited

FOREIGN PATENT DOCUMENTS

| | | | |
|---|---|---|---|
| JP | 56-022405 A | 3/1981 | |
| JP | 58-147707 A | 9/1983 | |
| JP | 59-037515 A | 3/1984 | |
| JP | 62-015504 A | 1/1987 | |
| JP | 05-233859 A | 9/1993 | |
| JP | 11-174237 A | 7/1999 | |
| JP | 11-326677 A | 11/1999 | |
| JP | 2000-284156 A | 10/2000 | |
| JP | 2001-147340 A | 5/2001 | |
| JP | 2004-347801 A | 12/2004 | |
| JP | 2005-250294 A | 9/2005 | |
| JP | 3902201 B2 | 4/2007 | |
| JP | 2009-163165 A | 7/2009 | |
| JP | 2011-232375 A | 11/2011 | |
| JP | 5233859 B2 | 7/2013 | |
| WO | 99/59013 A1 | 11/1999 | |
| WO | 2001/027673 A1 | 4/2001 | |
| WO | 2004/040347 A1 | 5/2004 | |
| WO | WO-2005103175 A1 * | 11/2005 | ......... C08G 18/2885 |
| WO | 2009/040271 A2 | 4/2009 | |
| WO | 2011/112764 A1 | 9/2011 | |
| WO | 2013/007969 A2 | 1/2013 | |
| WO | 2013/126429 A2 | 8/2013 | |
| WO | 2018/132918 A1 | 7/2018 | |
| WO | 2018/175122 A1 | 9/2018 | |
| WO | 2020/219477 A1 | 10/2020 | |

OTHER PUBLICATIONS

Glaesemann et al; "The Mechanical Reliability of Corning Optical Fiber in Small Bend Scenarios"; Corning; ISO 9001 Registered; (2007) 8 Pages.

Matsumoto et al; "Design and Characteristics of Reinforcement Method for Fusion Spliced Optical Fiber," J_ Lightwave Technol., LT-3, pp. 322-327, 1985.

Murase T, et al, "Single-mode non-strippable primary coated fiber", Optical Fiber Communication Conference (OFC), Technical Digest Post Conference Edition, vol. 54, Mar. 2001, p. ThC2.

Serafini.; "Compact and Reliable Protection of Single-Fiber and Ribbon-Fiber Fusion Splices" Proc. SPIE 1973, pp. 306-315 1993.

Trunk et al; "Protection With Heat-Shrinkable Sleeves for Optical Fiber Arc Fusion Splicing," Proc. SPIE 1365, Components for Fiber Optic Applications V, pp. 124-130, 1990.

Volotinen et al; "Effect of Mechanical Stripping and Arc-Fusion on the Strength and Aging of a Spliced Recoated Optical Fiber," Mat. Res. Soc. Symp. Proc. 531, pp. 163-168, 1998.

Wood, "Reliability of Optical Connectors and Splices", Proc. SPIE 2074, pp. 276-287, 1994.

Wu; "Method and Apparatus for Protecting Fusion Spliced Optical Fibers With Thermoplastic Material" Filed as U.S. Appl. No. 62/592,578, filed Nov. 30, 2017; 81 Pages.

Yablon, A.O.; "Optical Fiber Fusion Splicing," Springer, 2005; pp. 161-180.

Yamada et al., "Arc Fusion Splicer With Profile Alignment System For High-strength Low-loss Optical Submarine Cable", Journal of Lightwave Technology, vol. 4, No. 8, Aug. 1986, pp. 1204-1210.

* cited by examiner

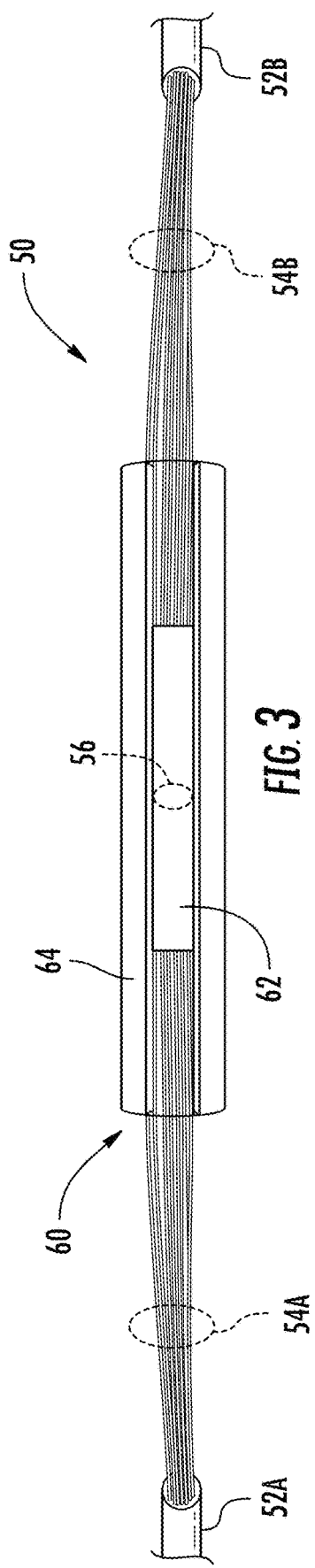
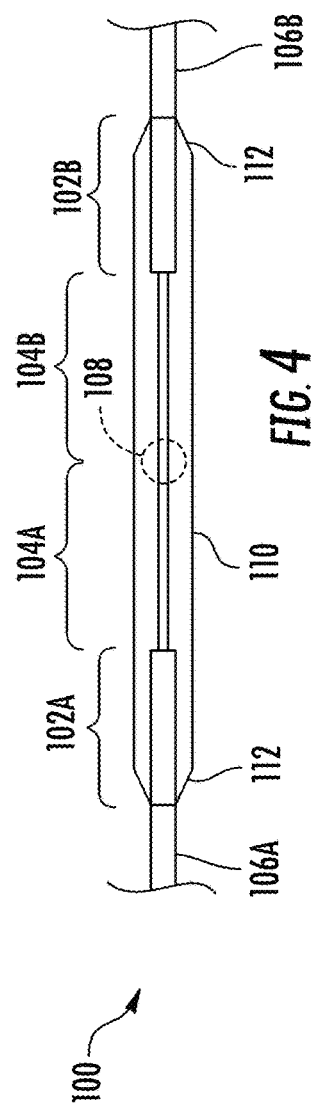
FIG. 3 (PRIOR ART)
FIG. 4

CABLE ASSEMBLY HAVING ROUTABLE SPLICE PROTECTORS

PRIORITY APPLICATION

This application claims the benefit of priority of U.S. Provisional Application No. 63/182,062, filed on Apr. 30, 2021, the content of which is relied upon and incorporated herein by reference in its entirety.

FIELD OF THE DISCLOSURE

This disclosure relates to fiber-optic cable assemblies that include fusion spliced optical fibers, and in particular, relates to fiber optic cable assemblies having fusion spliced optical fibers encased in a splice protector.

BACKGROUND OF THE DISCLOSURE

Optical fibers are useful in a wide variety of applications, including the telecommunications industry for voice, video, and data transmissions. In a telecommunications system that uses optical fibers, there are typically many locations where it may be necessary or useful to splice optical fibers together.

FIG. 1 is a cross-sectional view of an exemplary coated optical fiber 10 that includes a glass core 12, a glass cladding 14 surrounding the glass core 12, and a polymer coating 20 (which may include multiple coating layers, such as an inner primary coating layer 16 and an outer secondary coating layer 18) surrounding the glass cladding 14. The inner primary coating layer 16 may be configured to act as a shock absorber to minimize attenuation caused by any microbending of the coated optical fiber 10. The outer secondary coating layer 18 may be configured to protect the inner primary coating layer 16 against mechanical damage, and to act as a barrier to lateral forces. The outer diameter of the coated optical fiber 10 may be about 200 µm, about 250 µm, or any other suitable value. Optionally, an ink layer (e.g., having a thickness of about 5 µm) may be arranged over the outer secondary coating layer 18 of the coated optical fiber 10 to color the fiber (e.g., as is commonly used in ribbonized fibers), or a coloring agent may be mixed with the coating material that forms the outer secondary coating layer 18. An additional buffer coating ("buffer"; not shown), may be applied to the coated optical fiber 10 to provide additional protection and allow for easier handling, effectively forming a cable. The buffer may be embodied in a layer of different material applied to the polymer coating 20, thereby forming a "tight buffer" closely surrounding (intimately contacting and conforming to) the polymer coating 20. Alternatively, the buffer may be embodied in a pre-formed tube (also known as a furcation tube or buffer tube) that has an inner diameter larger than the polymer coating 20 and into which the coated optical fiber 10 is inserted, thereby forming a "loose buffer," wherein this additional buffer may have an outer diameter of about 900 µm.

In this disclosure, the term "optical fiber" (or "fiber") will be used in a generic sense and may encompass bare optical fibers, coated optical fibers, or buffered optical fibers, as well as optical fibers including different sections corresponding to these fiber types, unless it is clear from the context which of the types is intended. "Bare optical fibers" (including "bare glass optical fibers") or "bare sections" are those with no coating present on the fiber cladding. "Coated optical fibers" or "coated sections" include a single or multi-layer coating (typically an acrylic material) surrounding the fiber cladding and have a nominal (i.e., stated) diameter no greater than twice the nominal diameter of the bare optical fiber.

Optical fiber fusion splicing, which is the process by which a permanent, low-loss, high-strength, fused (or welded) joint is formed between two optical fibers, typically involves multiple tasks. First, polymer coatings (e.g., coating layers 16, 18 of FIG. 1) of coated optical fibers (e.g., coated optical fiber 10 of FIG. 1) are stripped to expose glass cladding (e.g., glass cladding 14 of FIG. 1). Next, flat fiber end faces are formed, typically by cleaving exposed glass portions of the fibers. Then the fibers are laterally aligned to each other. The fiber tips must be heated to their softening point and pressed together to form a splice joint. Checks such as loss estimation and proof testing (to ensure long-term mechanical reliability) may be performed. The completed fusion splice must also be protected from the environment using packaging, which serves to shield fiber surfaces from mechanical degradation (e.g., abrasion) and chemical degradation (e.g., humidity) to ensure that splices exhibit long-term reliability. Optical fibers must typically be able to withstand service temperatures spanning at least a range of from −40° C. to 85° C. without suffering significant mechanical and/or optical performance degradation.

A desirable fusion splice package should be relatively inexpensive, easy and quick to apply, resistant to thermal cycling, and compact in size. Moreover, a desirable fusion splice package should impart minimal geometric distortion to the splice, and should minimize mechanical loads (e.g., tensile, bending, or torsion loads) applied to the splice. Various splice protection strategies have been developed to address these concerns, segregated into two general categories: (1) splice protectors, which are typically rigid in character, and (2) recoats. Examples of conventional splice protectors include (i) heat shrink protection sleeves with integrated strength members (e.g., splints), and (ii) hard plastic (e.g., clam-shell type) cases, which serve to transfer mechanical loads across the splice joint. A recoat applies new polymer material over the splice joint and bare fiber sections, and whereby the mechanical integrity of the splice joint then depends primarily on the splice joint itself.

An exemplary heat shrink protection sleeve 30 used to protect a splice joint 32 formed between two coated optical fibers 10A, 10B is schematically illustrated in FIGS. 2A and 2B. The heat shrink protection sleeve 30 includes a generally cylindrical inner tube 34 (e.g., a melt-flow adhesive material such as ethylene vinyl acetate (EVA)) and a generally cylindrical outer tube 36 (e.g., a polyolefin and/or a fluorinated polymer such as polytetrafluorethylene (PTFE)), wherein the outer tube 36 generally surrounds the inner tube 34, and the inner tube 34 defines an interior passage 40. The outer tube 36 is required for conventional heat shrink protection sleeves because the melt-flow adhesive material (e.g., EVA) has a very high viscosity and a very low softening temperature (typically only about 100° C.). To ensure that the inner tube 34 wraps around the optical fibers 10A, 10B and the splice joint 32, the more temperature-resistant outer tube 36 is considered indispensable when the splice is intended for operation over a high temperature range of up to about 85° C.

In use, the heat shrink protection sleeve 30 is positioned over a fusion spliced section of two optical fibers 10A, 10B including the splice joint 32 arranged between (pre-stripped) glass cladding segments 14A, 14B of the respective optical fibers 10A, 10B. Upon application of heat (typically within an oven), the inner tube 34 melts around the optical fibers 10A, 10B, the glass cladding segments 14A, 14B, and the splice joint 32. The outer tube 36, which includes a cylindrical outer surface 38, may include some heat shrinking capability to help the adhesive distribute around the fused optical fibers 10A, 10B. Although not shown in FIGS. 2A and 2B, a heat shrink protection sleeve may further include a rigid strength member, such as a stainless steel rod bound by the adhesive material.

Heat shrink protection sleeves embody a proven technology with high reliability; however, they are bulky, inflexible, and time-consuming to apply. Heat shrink protection sleeves similar to those outlined above have also been applied to protect optical fiber splices, which include a fusion splice between first and second optical fibers. In such a context, an integrated strength member typically includes a flat or cylindrical surface to support the fusion spliced optical fibers, a meltflow inner tube melted around the spliced optical fibers and the integrated strength member, and a more temperature-resistant outer heat shrink tube encasing the thermoplastic inner tube. The cross-section of a typical optical fiber splice protector is 3.1 mm in diameter after heat cure, and the length is about 40 mm.

In view of the foregoing, a need remains in the art for multi-fiber splice protectors and fiber optic cable assemblies incorporating fusion splices and splice protectors to address the above-described and other limitations associated with conventional splice protectors and fiber optic cable assemblies, as well as associated fabrication methods.

SUMMARY OF THE DISCLOSURE

The present disclosure relates to various types of optical fibers that are spliced together with a splice protector provided to house the spliced optical fibers. The splice protector has dimensions that enable improved mechanical properties of the spliced optical fiber.

In one embodiment, an optical fiber assembly is provided. The optical fiber assembly comprising: a first optical fiber and a second optical fiber each including a pre-coated section and a stripped section; a fusion splice including a splice joint joining an end of the stripped section of the first optical fiber with an end of the stripped section of the second optical fiber to form a fusion spliced optical fiber having a longitudinal axis; and a splice protector surrounding the splice joint, the splice protector including at least one wall arranged in a tubular shape having a central axis extending in a longitudinal direction, wherein the splice protector is bend-resistant, the at least one wall bounds an inner cavity extending in the longitudinal direction, and a longitudinal opening extends through an entire thickness of the at least one wall to permit passage of the pre-coated section of the first optical fiber or the pre-coated section of the second optical fiber into the inner cavity; and wherein the splice protector has a length in the longitudinal direction of between about 3 mm and about 5 mm.

In an alternate embodiment, the splice protector has a length in the longitudinal direction of about 3.5 mm. In an alternate embodiment, the optical fiber assembly further comprising a thermoplastic hotmelt material present in the inner cavity of the splice protector to encapsulate the splice joint as well as at least the stripped sections of the first and second optical fibers. In an alternate embodiment, at least one of the first optical fiber and the second optical fiber comprise a glass core, a glass cladding surrounding the glass core, and a polymer coating surrounding the glass core and the glass cladding, wherein the polymer coating has a pencil hardness greater than 3H on Polymethylmethacrylate (PMMA) film. In an alternate embodiment, the polymer coating has a modulus of elasticity between 0.1 GPa and 3 GPa. In an alternate embodiment, at least one of the first optical fiber and the second optical fiber comprises a glass core, a glass cladding surrounding the glass core, a polymer coating surrounding the glass core and the glass cladding, an inner polymer coating surrounding the glass core and the glass cladding, and an outer polymer coating surrounding the inner polymer coating.

In one embodiment, an optical fiber cable assembly is provided. The optical fiber cable assembly comprising: a first optical fiber and a second optical fiber each including a pre-coated section and a stripped section; a fusion splice including a splice joint joining an end of the stripped sections of the first optical fiber with an end of the stripped section of the second optical fiber to form a fusion spliced optical fiber; and a splice protector surrounding the splice joint, the splice protector including at least one wall arranged in a tubular shape having a central axis extending in a longitudinal direction, wherein the strength member is bend-resistant, the at least one wall bounds an inner cavity extending in the longitudinal direction, and a longitudinal opening extends through an entire thickness of the at least one wall to permit passage of a pre-coated section of a fusion spliced optical fiber into the inner cavity; and wherein the optical fiber cable assembly has a macrobend loss of less than 0.01 dB at a wavelength of 1550 nm and at a mandrel radius of 15 mm.

In an alternate embodiment, the optical fiber cable assembly has a macrobend loss of less than 0.01 dB at a wavelength of 1550 nm and at a mandrel radius of 10 mm. In an alternate embodiment, the optical fiber cable assembly has a macrobend loss of less than 0.01 dB at a wavelength of 1550 nm and at a mandrel radius of 7.5 mm. In an alternate embodiment, the splice joint has an insertion loss of less than 0.05 dB at a reference wavelength of 1550 nm. In an alternate embodiment, the splice protector is made of stainless steel, alloy, glass, or ceramic. In an alternate embodiment, at least one of the first optical fiber and the second optical fiber comprise a glass core, a glass cladding surrounding the glass core, and a polymer coating surrounding the glass core and the glass cladding, wherein the polymer coating has a pencil hardness greater than 3H on Polymethylmethacrylate (PMMA) film. In an alternate embodiment, at least one of the first optical fiber and the second optical fiber comprises a glass core, a glass cladding surrounding the glass core, a polymer coating surrounding the glass core and the glass cladding, an inner polymer coating surrounding the glass core and the glass cladding, and an outer polymer coating surrounding the inner polymer coating.

In one embodiment, a method of making an optical fiber cable assembly is provided. The method of making an optical fiber cable assembly comprising: cleaving a first optical fiber and a second optical fiber; wherein at least one of the first optical fiber and the second optical fiber comprise a glass core, a glass cladding surrounding the glass core, and a polymer coating surrounding the glass core and the glass cladding, wherein the polymer coating has a pencil hardness greater than 3H on Polymethylmethacrylate (PMMA) film; cleaning respective polymer coatings of the first and the second optical fibers to remove at least end sections of the respective polymer coatings and thereby yield a first bare optical fiber portion and a second bare optical fiber portion; splicing the first bare optical fiber portion to the second bare optical fiber portion to form a fusion spliced optical fiber; inserting the fusion spliced optical fiber into a longitudinal opening of the splice protector, wherein the splice protector has a length in a longitudinal direction of between about 3 mm and about 5 mm.

In an alternate embodiment, the splice protector has a length in the longitudinal direction of about 3.5 mm. In an alternate embodiment, the optical fiber cable assembly has a macrobend loss of less than 0.01 dB at a wavelength of 1550 nm and at a mandrel radius of 15 mm. In an alternate embodiment, the optical fiber cable assembly has a macrobend loss of less than 0.01 dB at a wavelength of 1550 nm and at a mandrel radius of 10 mm. In an alternate embodiment, the optical fiber cable assembly has a macrobend loss of less than 0.01 dB at a wavelength of 1550 nm and at a mandrel radius of 7.5 mm.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 3 is a side view of segments of two small round-type fiber optic cables from which twelve loose fibers extend, with the loose fibers being spliced in a one-dimensional array and protected by a conventional multi-fiber heat shrink protection sleeve.

FIG. 4 is a side schematic view of an overcoated fusion spliced optical fiber.

DETAILED DESCRIPTION

Figure 1:
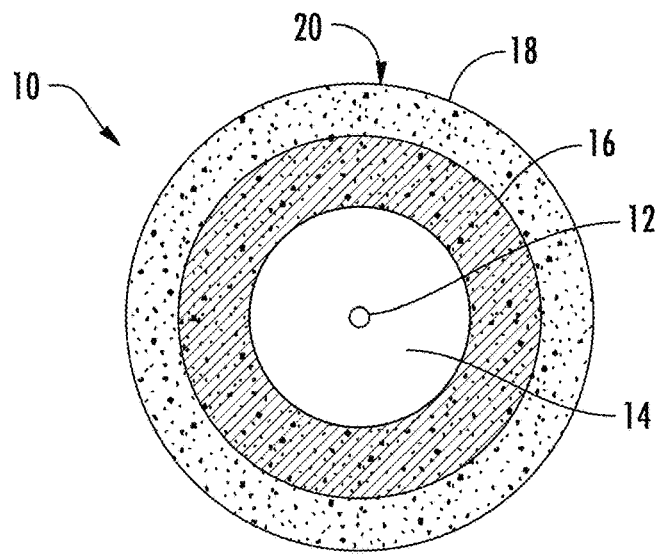
FIG. 1 is a cross-sectional view of a conventional coated optical fiber that may be subject to fusion splicing, prior to stripping of a multi-layer polymer coating from glass cladding.
Figure 2A:
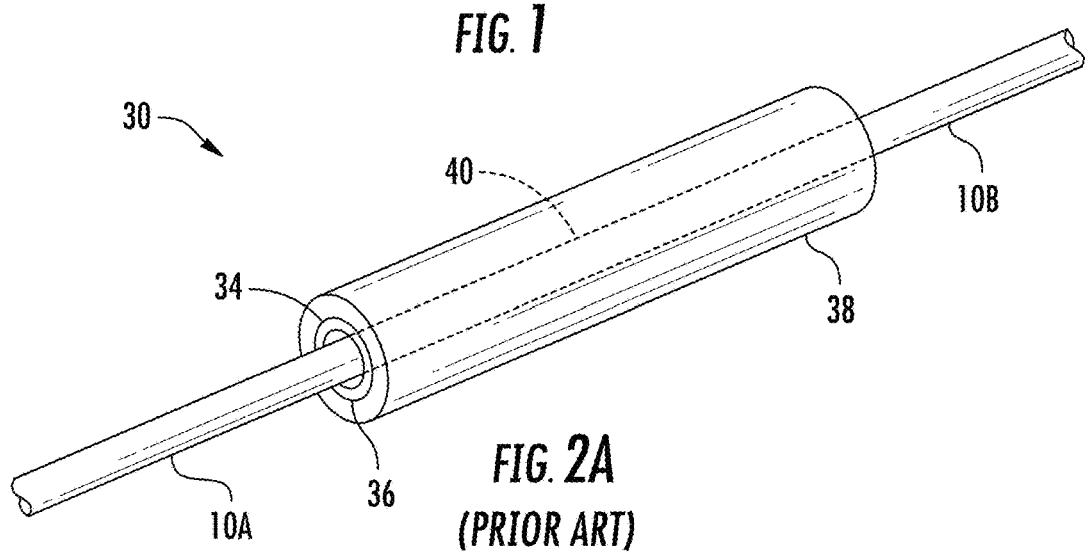
FIG. 2A is a schematic perspective view of a conventional heat shrink protection sleeve used to protect a splice joint between two optical fibers.
Figure 2B:
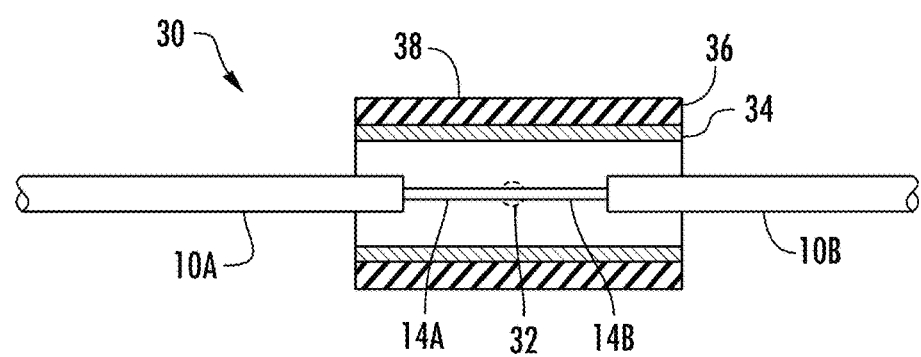
FIG. 2B is a schematic cross-sectional view of the heat shrink protection sleeve and optical fibers of FIG. 2A, with schematic illustration of the splice joint between stripped portions of the two optical fibers.

Various embodiments will be further clarified by examples in the description below. In general, the description relates to various types of optical fibers that are spliced together with a splice protector provided to house the spliced optical fibers. The splice protector has dimensions that enable desirable mechanical properties of the spliced optical fiber.

In this disclosure, the language "strength member," in the context of a fiber splice protector, refers to a member having at least one wall arranged in a tubular shape that bounds an inner cavity extending in a longitudinal direction, with the at least one wall defining a longitudinal opening that permits passage of a coated optical fiber into the inner cavity. In some embodiments, the longitudinal opening has a first width extending in a direction transverse to the longitudinal direction, and the first width is greater than a diameter of one coated optical fiber. In some embodiments, the inner cavity comprises a second width extending in the direction transverse to the longitudinal direction. In some embodiments, the second width is greater (e.g., at least two times, at least three times, at least four times, or at least five times greater).

In this disclosure, the language "fusion spliced optical fiber" refers to two optical fibers that have been fusion spliced together to form a permanent, optical link incorporating the two optical fibers. The singular noun "fusion spliced optical fiber" is used even though two optical fibers are initially present because, after fusion splicing, the resulting optical link is intended to function like a continuous optical fiber (even though there may be some attenuation resulting from the fusion splice joint).

Likewise, in this disclosure, the two optical fibers that define a given "fusion spliced optical fiber" may alternatively be referred to as "optical fiber segments." Using the language "optical fiber segments" rather than "optical fibers" helps clarify when the disclosure is referring to one of the pairs of optical fibers that form one of the fusion spliced optical fibers, versus one of the fusion spliced optical fibers itself.

In certain embodiments, a fiber optic cable assembly includes a plurality of fusion spliced single optical fibers, with each spliced single optical fiber including two optical fiber segments that are arranged serially and joined together by a splice (e.g., a fusion splice) to define a fusion splice joint. The fusion splice joints of the plurality of fusion spliced single optical fibers define a fusion splice region of the fiber optic cable assembly. The fiber optic cable assembly may include a polymeric overcoating, in which polymeric material beneficially overcoats or encapsulates the fusion splice region and stripped sections of the optical fibers. The polymeric material may include or consist of a thermoplastic hotmelt material. In certain embodiments, the maximum width and height dimensions of the polymeric material are only slightly larger than maximum width and height dimensions of an array of pre-coated sections of the optical fibers proximate to the stripped sections. For example, in certain embodiments, the largest height and width portions of the polymeric material may correspond to areas in which the polymeric material overlaps the pre-coated (i.e., acrylate coated) sections of optical fibers. In certain embodiments, the polymeric material overlap region has a length of at least 1 mm, at least 3 mm, or another length specified herein. If the polymeric material has a thickness in such regions in a range of from 0.05 mm to 0.3 mm, then in certain embodiments, the greatest height and/or width portion of the polymeric material may exceed a greatest height and/or width portion of a corresponding array of pre-coated sections of optical fibers (proximate to the stripped sections of optical fibers) by dimensions in one of the following ranges: a range of from 0.1 mm to 0.6 mm, a range of from 0.2 mm to 0.6 mm, a range of from 0.1 mm to 0.5 mm, a range of from 0.2 mm to 0.5 mm, a range of from 0.2 mm to 0.4 mm, a range of from mm to 0.3 mm, a range of from 0.3 mm to 0.6 mm, or a range of from 0.4 mm to 0.6 mm.

In certain embodiments, the following steps may be performed prior to sequential insertion of fusion spliced optical fiber through the longitudinal opening of a splice protector into an inner cavity thereof: cleaving a first optical fiber and a second optical fiber; cleaning respective polymer coatings of the first and the second optical fibers to remove at least end sections of the respective polymer coatings and thereby yield a first bare optical fiber portion and a second bare optical fiber portion; splicing the first bare optical fiber portion to the second bare optical fiber portion to form a fusion spliced optical fiber.

In certain embodiments, a splice protector has a length at least as long as the total length of stripped sections of optical fiber segments to be spliced. For individually spliced fibers, the total length of a splice protector may be as short as about 3.5 mm. A short splice protector is desired to minimize the rigid length in a spliced cable and improve the packing density of the cable assembly. Length, thickness, and material composition of a strength member can be optimized to confer a desired degree of bend resistance to a multi-fiber splice protector. One method for evaluating bend resistance of a multi-fiber splice protector as described herein is with a three point bending model, assuming that ends of the splice protector are supported (e.g., from below) and a force is applied to the middle of the multi-fiber splice protector in a direction (e.g., downward direction) opposing the support. In certain embodiments, a bend resistant multi-fiber splice protector can withstand such a force of at least one of the following values, with the splice protector arranged in any radial orientation and without deformation: at least 5 lbf, at least 20 lbf, at least 50 lbf, within a range of 5 lbf to 100 lbf, within a range of 20 lbf to 100 lbf, or within a range of 50 lbf to 100 lbf.

FIG. 4 illustrates an overcoated fusion spliced optical fiber 100, composed of optical fiber segments 102A, 102B and a solid overcoating 110 of thermoplastic hotmelt material having a substantially constant outer diameter over the majority of its length. Each optical fiber segment 102A, 102B includes a coating (e.g., an acrylate coating), with portions of each optical fiber segment 102A, 102B being previously stripped of such coating to form stripped sections 104A, 104B embodying glass cladding. Ends of the stripped sections 104A, 104B are fusion spliced at a splice joint 108 to form a fusion spliced optical fiber. The solid overcoating 110 of thermoplastic hotmelt material extends over the splice joint 108, the previously stripped sections 104A, 104B, and short lengths 106A, 106B of the coated optical fiber segments 102A, 102B. As shown in FIG. 4, the solid overcoating 110 may include tapered thickness ends 112, with a remainder of the solid overcoating 110 having a substantially constant outer diameter that exceeds an outer diameter of the coated optical fiber segments 102A, 102B. The coated optical fiber segments 102A, 102B may each have a nominal outer diameter of 0.25 mm (250 μm) in some embodiments. In certain embodiments, the solid overcoating 110 of thermoplastic hotmelt material may include an outer diameter in a range of from 0.2 mm to mm, from 0.2 mm to 0.7 mm, from 0.2 mm to 0.5 mm, from 0.25 mm to 0.9 mm, from 0.25 mm to 0.7 mm, or from 0.25 mm to 0.5 mm.

A thermoplastic hotmelt material useable to overcoat fusion spliced optical fibers comprises a thermoplastic material that may be heated to a flowable state. In certain embodiments, fusion spliced optical fibers may be temporarily placed in a cavity (e.g., a mold cavity), a housing, a trough, or a container in which thermoplastic hotmelt material in a flowable state is present, or to which such thermoplastic hotmelt material in a flowable state is supplied. In certain embodiments, fusion spliced optical fibers may be dipped into (or otherwise contacted with) a pool of molten thermoplastic material to effectuate coating. In certain embodiments, a polymeric material that may be used to overcoat portions of fusion spliced optical fibers may include a melt-flow thermoplastic adhesive material. Examples of thermoplastic hotmelt materials that may be used in certain embodiments include, but are not limited to, ethylene vinyl acetate (EVA), polyurethanes, and polyamides.

In certain embodiments, to avoid thermal degradation of one or more acrylate coating layers of the pre-coated sections of the fusion spliced optical fibers, molten thermoplastic material to be used for overcoating should be maintained at a processing temperature below a melt temperature of the one or more acrylate coating layers. To promote formation of a suitable overcoating, the molten thermoplastic material may also be maintained at a processing temperature at which the molten thermoplastic material has a melt viscosity in a range of from about 100 centipoises (cps) to about 10,000 cps, or more preferably in a subrange of from about 1,000 cps to about 10,000 cps, or more preferably in a subrange of from about 2,000 cps to about 4,000 cps.

In certain embodiments, desirable thermoplastic hotmelt and/or overcoating materials differ from conventional melt-flow adhesive glue sticks or typical thermoplastic materials in that they desirably: have a medium viscosity (e.g., according to one or more of the ranges outlined above) at a processing temperature; are chemically stable at the processing temperature, have a glass transition temperature of no greater than −40° C.; have a service temperature spanning at least a range of from −40° C. to 85° C. without suffering significant mechanical and/or optical performance degradation; exhibit strong adhesion to fiber coating layers and bare glass; are free from charring; and/or exhibit minimal to no outgassing (e.g., of volatile organic compounds and/or other constituents). A glass transition temperature is the point at which a material goes from a hard brittle state to a flexible or soft rubbery state as temperature is increased. A common method for determining glass transition temperature uses the energy release on heating in differential scanning calorimetry. If a plastic (e.g., thermoplastic) material associated with an optical fiber is exposed to a temperature below its glass transition temperature, then the material will become very hard, and the optical fiber may be susceptible to micro bend losses. In certain embodiments, service temperature of a thermoplastic overcoating material may be determined by compliance with one or more industry standards for telecommunication fiber reliability testing, such as (but not limited to): ITU-T G.652, IEC60793-2, Telcordia GR-20-CORE and TIA/EIA-492.

In certain embodiments, a thermoplastic hotmelt material and/or a thermoplastic overcoating useable with embodiments disclosed herein has a heat resistance temperature of at least 100° C., a melting temperature of less than 240° C., and a melt viscosity of less than 10,000 cps. In certain embodiments, a thermoplastic hotmelt material may comprise a melt-flow thermoplastic adhesive material, such as TECHNOMELT® PA 6208 polyamide material (Henkel Corp., Dusseldorf, Germany). Such material exhibits a heat resistance temperature greater than 90° C., a melt-flow temperature lower than 260° C., a melt viscosity between 100 cps and 10,000 cps, and a hardness of at least Shore A 45. Further details regarding thermoplastic overcoating of fusion spliced optical fibers and/or portions of fiber optic cable assemblies are disclosed in U.S. Patent Application Publication No. 2020/0012047A1 published on Jan. 9, 2020, wherein the content of the foregoing publication is hereby incorporated by reference herein.

In certain embodiments, a thermoplastic hotmelt material useable with multi-fiber splice protectors disclosed herein may include PA682 hotmelt adhesive commercially available from Henkel. However, it is within the scope of the present disclosure that in alternate embodiments, other suitable polymeric materials (e.g., UV curable polymer) may be used with multi-fiber splice protectors.

Formation of a solid thermoplastic overcoating over at least a short distance of pre-coated sections of optical fibers bounding a spliced segment (e.g., at either end of stripped sections joined at a splice joint) beneficially ensures that all previously stripped (glass) sections are fully overcoated. In certain embodiments, a solid thermoplastic overcoating extends over a length of a pre-coated section of each of the first and second optical fibers, wherein the overcoated length of each pre-coated section is in a range of from about 1 mm to about 10 mm. Additionally, since the solid thermoplastic overcoating may adhere to one or more coating layers of an optical fiber more readily than to (pre-stripped) exposed glass sections, providing a solid thermoplastic overcoating of sufficient length to overlap at least a short distance of pre-coated sections of optical fibers bounding a spliced segment promotes more secure adhesion between the solid thermoplastic overcoating and the fusion spliced segment as a whole. In certain embodiments, a solid thermoplastic overcoating and a fusion spliced segment utilize a thermoplastic material that is devoid of additives configured to promote adhesion to glass, such as silane. A solid thermoplastic overcoating as disclosed herein is preferably not subject to delamination during normal handling over the required service conditions and lifetime of a fiber optic cable.

In preferred embodiments, a solid thermoplastic overcoating is water-resistant and serves to block moisture from reaching the splice joint and the previously stripped glass region of a fusion spliced segment of optical fibers. This is beneficial since moisture is known to chemically interact with glass cladding of optical fibers and cause expansion of micro defects in the glass, thereby leading to long-term failure of optical fibers. The solid thermoplastic overcoating is preferably also devoid of sharp particles (e.g., inorganic filler particles) and air bubbles. The solid thermoplastic overcoating may also be devoid of a UV curable material. In certain embodiments, formation of air bubbles may be reduced by contacting stripped sections and pre-coated sections of fusion spliced first and second optical fibers with molten thermoplastic material in a subatmospheric pressure environment (e.g., in a range of from 0.01 to 0.9, or 0.1 to 0.8, or 0.1 to 0.7 times local atmospheric pressure), such as may be attained in a partially evacuated chamber or other enclosure.

In certain embodiments, the thermoplastic hotmelt material with which the fusion spliced optical fibers are overcoated is compositionally the same as (or substantially similar to) thermoplastic hotmelt material initially present within the inner cavity of the strength member (i.e., prior to insertion of optical fibers through the longitudinal opening). Compositional matching between the overcoating material and the thermoplastic hotmelt material initially present within the inner cavity permits the respective materials (upon heating) to assimilate without a dissimilar material boundary after fusion spliced optical fibers are inserted through a longitudinal opening into the inner cavity of a strength member to form a cable assembly including a multi-fiber splice protector.

In certain embodiments, pre-coated (i.e., acrylate coated) optical fibers subject to being fusion bonded and overcoated (or encapsulated) according to methods disclosed herein are prepared for fusion bonding (e.g., by stripping ends thereof) utilizing non-contact fiber stripping methods and/or apparatuses, such as those disclosed in U.S. Pat. No. 9,167,626 B2 ("the '626 Patent"), which is hereby incorporated by reference. Briefly, the '626 Patent discloses use of a heater configured for heating a heating region to a temperature above a thermal decomposition temperature of at least one coating of an optical fiber, a securing mechanism for securely positioning a lengthwise section of the optical fiber in the heating region, and a controller operatively associated with the heater and configured to deactivate the heater no later than immediately after removal of the at least one coating from the optical fiber. Thermal decomposition of at least one coating of an optical fiber reduces or minimizes formation of flaws in optical fibers that may be generated by mechanical stripping methods and that can reduce their tensile strength.

A strength member of an optical fiber splice protector has at least one wall arranged in a tubular shape with a longitudinal opening (e.g., a slot) extending through an entire thickness of the at least one wall to permit passage of a coated optical fiber into an inner cavity of the splice protector. In certain embodiments, a strength member comprises a single wall that is bent into a curved (e.g., cylindrical or oval) cross-sectional shape. In certain embodiments, an exterior of a strength member comprises a generally cylindrical shape, and the inner cavity of a strength member also comprises a generally cylindrical shape. In certain embodiments, an exterior and/or an inner cavity of a strength member may comprise a cross-sectional profile that is polygonal (e.g., triangular, square, pentagonal, hexagonal, heptagonal, octagonal, etc.) or rounded polygonal in shape. In other certain embodiments, the strength member of the splice protector comprises a single wall that is formed into a U-shaped structure. In certain embodiments, the wall thickness of the strength member of the splice protector may be less than 2 mm or less than 1 mm. In certain embodiments, the wall thickness of the strength member of the splice protector is 0.7 mm. In certain other embodiments, the strength member of the splice protector is U-shaped and is formed from a sheet metal with a wall thickness of 0.15 mm and an inner cavity thickness of 0.40 mm. As can be appreciated, a tubular shape can have different cross-sectional profiles depending on the embodiment. In this disclosure, "tubular shape" merely refers to a shape that is generally elongate (i.e., longer than wide) and has an inner cavity. In certain embodiments, such a shape may have a cross-sectional profile of any suitable configuration, such as round, oval, square, polygonal, etc.

Various materials and fabrication techniques may be used to produce strength members as disclosed herein. In certain embodiments, at least one wall of a strength member as disclosed herein may comprise glass, metal, ceramic, and/or composite materials. Depending on the material(s) used, strength members may be fabricated by injection molding, extrusion, machining, rolling, bending, stamping, pressing, sintering or the like, optionally combined with one or more heating and/or cooling steps. In certain embodiments, a strength member may comprise a metal (e.g., stainless steel—300 series stainless steel, 400 series stainless steel, etc.) slotted roll pin, of which various sizes are commercially available. In certain embodiments, strength member resembling a slotted roll pin (or similar shape) may be fabricated of non-metals such as thin glass, ceramics, or glass ceramics. In certain embodiments, a longitudinal opening defined in a strength member may have a substantially constant width regardless of wall depth position (e.g., with respect to distance from a longitudinal axis extending through a strength member). In certain embodiments, a longitudinal opening defined in a strength member may have a width that varies with wall depth position, such as a width that is larger closer to an outer surface of a strength member, and that is smaller closer to an inner cavity of a strength member. In certain embodiments, a longitudinal opening may be defined in a wall of tubing by dicing through a wall of the tubing.

Following fabrication of a strength member, thermoplastic hotmelt material may be loaded into an inner cavity of a strength member using any suitable methods. Such methods may include: injecting/dispensing molten thermoplastic hotmelt material through the longitudinal opening and/or open ends of the strength member; pressing a length of solid thermoplastic hotmelt material into one or more open ends of the strength member into the internal cavity; combinations of the foregoing; or any other suitable method. In certain embodiments, the splice protector is U-shaped, and the thermoplastic hotmelt material occupies a portion of the inner cavity volume. In certain other embodiments, the thermoplastic hotmelt material occupies a portion of the inner cavity volume and extends beyond the longitudinal opening of the strength member of the splice protector, wherein upon insertion of the optical fiber(s) or optical fiber ribbon into the inner cavity of the strength member and the thermoplastic hotmelt material, the thermoplastic hotmelt material encloses the optical fiber(s) or optical fiber ribbons and fills the entire volume of the inner cavity as discussed herein.

Figure 5A:
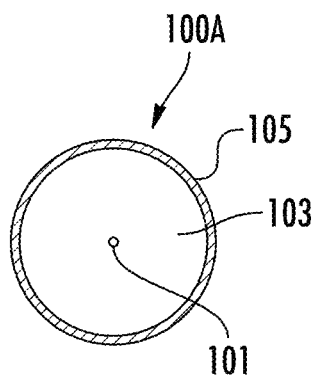
FIGS. 5A-5D are cross sectional views of optical fibers illustrating various layers of the optical fibers.
Figure 5B:
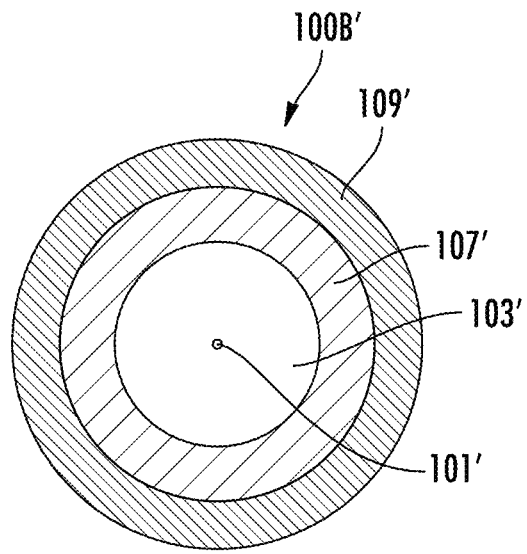
Figure 5C:
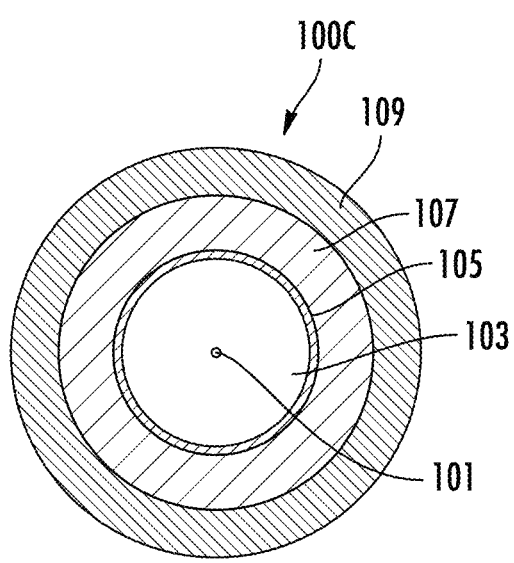

Referring now to FIGS. 5A-5C, various types of optical fibers 100 are shown. In particular, referring first to FIG. 5A, a single layer thin coated optical fiber 100A is shown. Optical fiber 100A comprises a glass core 101, a glass cladding 103 surrounding glass core 101, and a polymer coating 105 surrounding glass core 101 and glass cladding 103. In some embodiments, optical fiber 100A has a diameter of about 125 µm, and glass cladding 103 has a diameter ranging between about 100 µm and 120 µm. In some embodiments, glass cladding 103 has a diameter of about 115 µm. In some embodiments, glass cladding 103 has a diameter of about 125 µm, and optical fiber 100A has a diameter ranging between about 130 µm and 160 µm. Polymer coating 105 may be configured to act as a shock absorber to minimize attenuation caused by any microbending of the coated optical fiber 100. In some embodiments, the thickness of polymer coating 105 is between 0.1 µm and 10 µm, 0.1 µm and 5 µm, or 0.1 µm and 2.5 µm about the circumference of optical fiber 100. In some embodiments, the thickness of polymer coating 105 has a standard deviation ranging between µm and 0.5 µm, 0.1 µm and 0.3 µm, or 0.1 µm and 0.2 µm. Polymer coating 105 is made of a high hardness and has a high modulus of elasticity. In some embodiments, polymer coating has a hardness (Shore D) value greater than 60, greater than 70, or greater than 80 as measured by methods known in the art, such as ASTM D2240, for example. In one embodiment, polymer coating 105 has a hardness (Shore D) value of about 95 as measured by methods known in the art, such as ASTM D2240, for example. In some embodiments, polymer coating 105 has a pencil hardness value greater than 3H, greater than 4H, or greater than 5H on Polymethylmethacrylate (PMMA) film as measured by methods known in the art, such as ASTM D3363, for example. In some embodiments, polymer coating 105 has a modulus of elasticity between 0.1 GPa and 3 GPa, between 0.5 GPa and 2.5 GPa, or between 0.5 GPa and 2 GPa as measured by standard methods known in the art. In another embodiment, polymer coating 105 has an elastic modulus of about 2.5 GPa.

Polymer coating 105 is made of various materials including UV-cured acrylates or organic UV-curing acrylate resins filled with $SiO_2$ or $ZrO_2$ nanoparticles or non-acrylate polymers such as polyimides. Polymer coating 105 may also include a silane additive to promote bonding to glass or inorganic surfaces. In some embodiments, the silane additive includes acryloxy silanes, methacrylate silanes, or Mercapto silanes, such as (3-Mercaptopropyl) trimethoxysilane and (3-acryloxypropyl)trimethoxysilane.

Figure 5D:
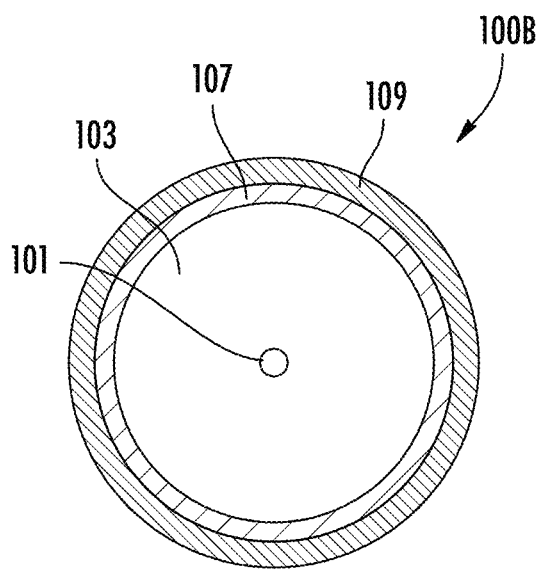
Figure 10:
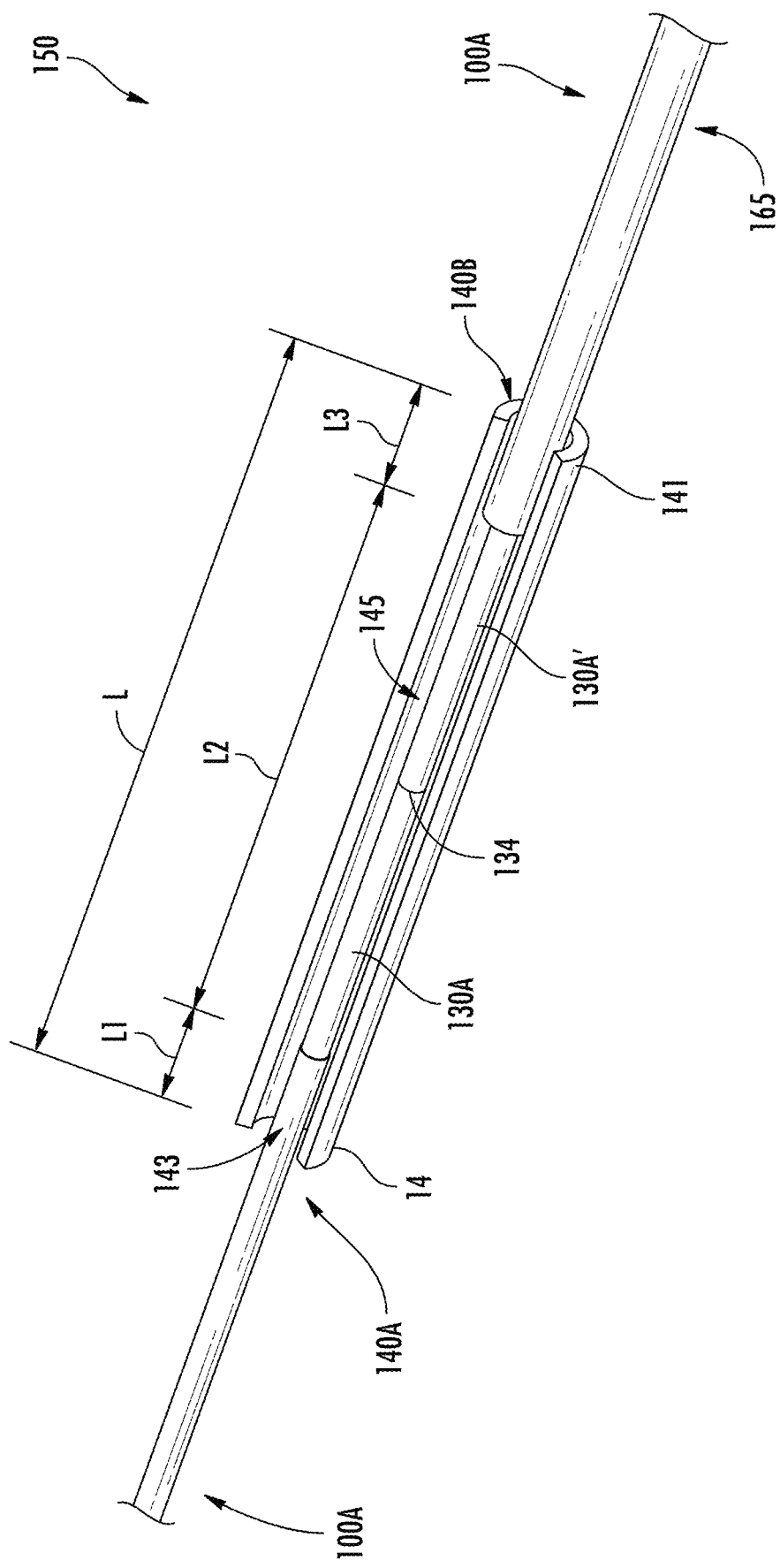
FIG. 10 is a perspective view of a cable assembly with a spliced optical fiber and a splice protector in accordance with the present disclosure.

Referring now to FIG. 5B, one example of a typical dual layer optical fiber 100B' is shown. Optical fiber 100B' is substantially similar to optical fiber 10 shown in FIG. 1 and described above where optical fiber 100B' comprises a glass core 101', a glass cladding 103' surrounding glass core 101', an inner polymer coating 107' surrounding glass core 101' and glass cladding 103', and an outer polymer coating 109' surrounding inner polymer coating 107'. Referring briefly to FIG. 5D, a dual layer optical fiber of the present disclosure is shown. Similar to optical fiber 100B' of FIG. 5B, optical fiber 100B comprises a glass core 101, a glass cladding 103 surrounding glass core 101, an inner polymer coating 107 surrounding glass core 101 and glass cladding 103, and an outer polymer coating 109 surrounding inner polymer coating 107. In contrast to optical fiber 100B' of FIG. 5B, inner polymer coating 107 and outer polymer coating 109 are thinner than inner polymer coating 107' and outer polymer coating 109' of optical fiber 100B. In some embodiments, inner polymer coating 107 has a thickness of about 7.5 μm. Thinner coatings 107, 109 of optical fiber 100B enables fusion splicing of optical fiber 100B with minimal deformation to splice joint 134 (FIG. 10). In some embodiments, the insertion loss due to fusion splicing is less than 0.1 dB at a reference wavelength of 1550 nm.

Referring to FIG. 5C, a triple layer optical fiber 100C is shown. Optical fiber 100C comprises a glass core 101, a glass cladding 103 surrounding glass core 101, a polymer coating 105 surrounding glass core 101 and glass cladding 103, an inner polymer coating 107 surrounding glass core 101 and glass cladding 103, and an outer polymer coating 109 surrounding inner polymer coating 107. Inner polymer coating 107 is made of various acrylate coatings. Inner polymer coating 107 has a modulus of elasticity ranging between 0.1 MPa to 1 MPa. Outer polymer coating 109 is also made of various acrylate coatings, and outer polymer coating 109 has a modulus of elasticity of about 1 GPa.

Figure 6:
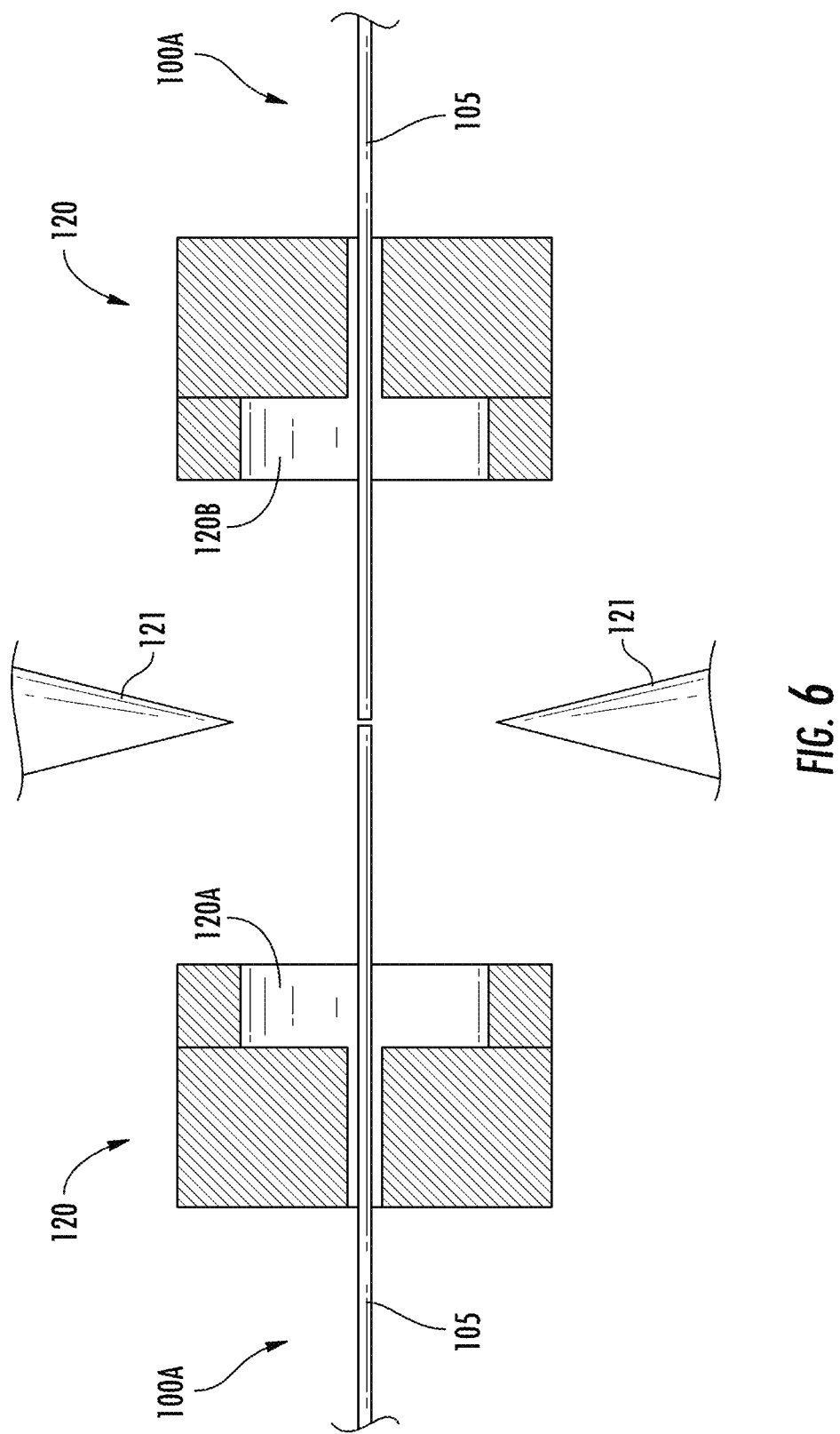
FIGS. 6 and 7 are top views of a splicer illustrating cleaving and cleaning of thin coated single layer optical fibers in accordance with the present disclosure.
Figure 7:
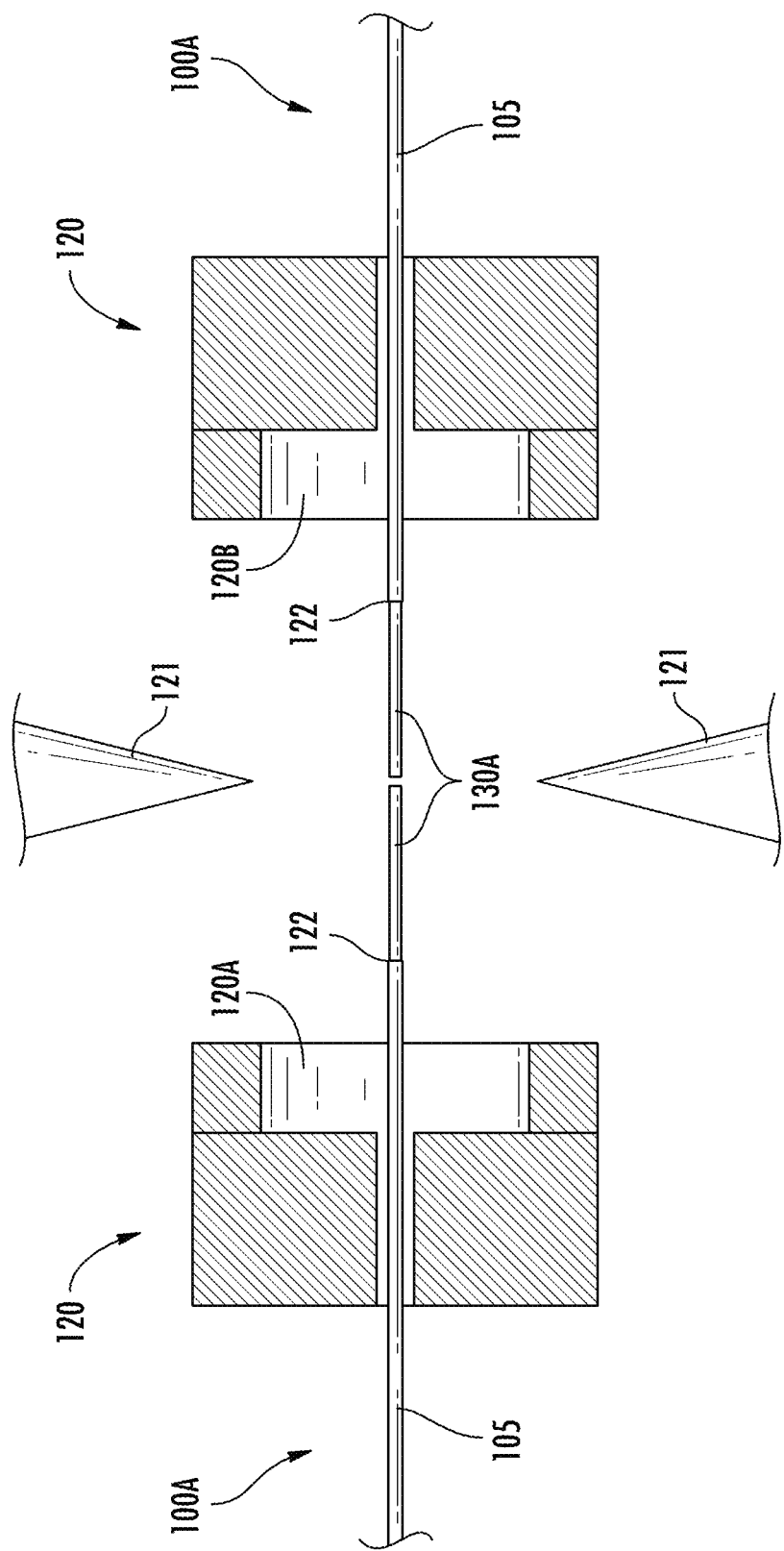

Referring now to FIGS. 6 and 7, images of splicing single layer thin coated optical fibers 100A are shown. Optical fibers 100A are first cleaned and then directly placed on fiber cleavers (not shown). Fiber cleavers include a blade that is slightly raised to cut through polymer coating 105 and score glass cladding 103 (FIG. 5A). Then, the portions of optical fibers 100A with unstripped polymer coating 105 are placed on a core alignment fusion splicer 120 as shown in FIG. 6. This process is unlike standard fusion splicing processes where optical fibers 100 are stripped and cleaved prior to placement on splicer 120.

Splicer 120 includes stages or v-grooves 120A, 120B upon which optical fibers 100A rest and are aligned with each other. Once optical fibers 100A are placed onto splicer 120, optical fibers 100A undergo fusion arc cleaning as described below. In the first step of fusion arc cleaning, a discharge current sent by electrodes 121 of less than 300 ms is employed to remove dust off optical fiber 100A, and polymer coating 105 is removed by thermo decomposition resulting in edges 122 of optical fibers 100A as shown in FIG. 7. Stated another way, edges 122 are created by the aforementioned step where each edge 122 is an end of polymer coating 105 from which bare optical fiber 130A (comprising glass core 101 and glass cladding 103) extends. Then, bare optical fibers 130A can be removed from splicer 120 and can be optionally cleaned by a solvent (e.g., isopropanol or other cleaning agents) in an ultrasonic bath or a soaked wipe. Bare optical fibers 130A are then placed onto splicer 120 to continue core alignment and fusion splicing process (via electrodes 121) of bare optical fibers 130A of optical fibers 100A. In some embodiments, the diameter of bare optical fiber 130A is about 125 and the arc current and/or arc duration is reduced. In some embodiments, current emitted by electrodes 121 is applied for a time of between about 1.5 seconds and about 2 seconds depending on the current applied. In some embodiments, after splicing bare optical fibers 130A, the spliced optical fiber 160 has a splice insertion loss of about 0.02 dB at a reference wavelength of 1550 nm. It is within the scope of the present disclosure that in alternate embodiments, other methods may be employed to heat and fuse optical fibers 100A, 100A' such as CO2 laser, resistive heaters, or the like.

Figure 8:
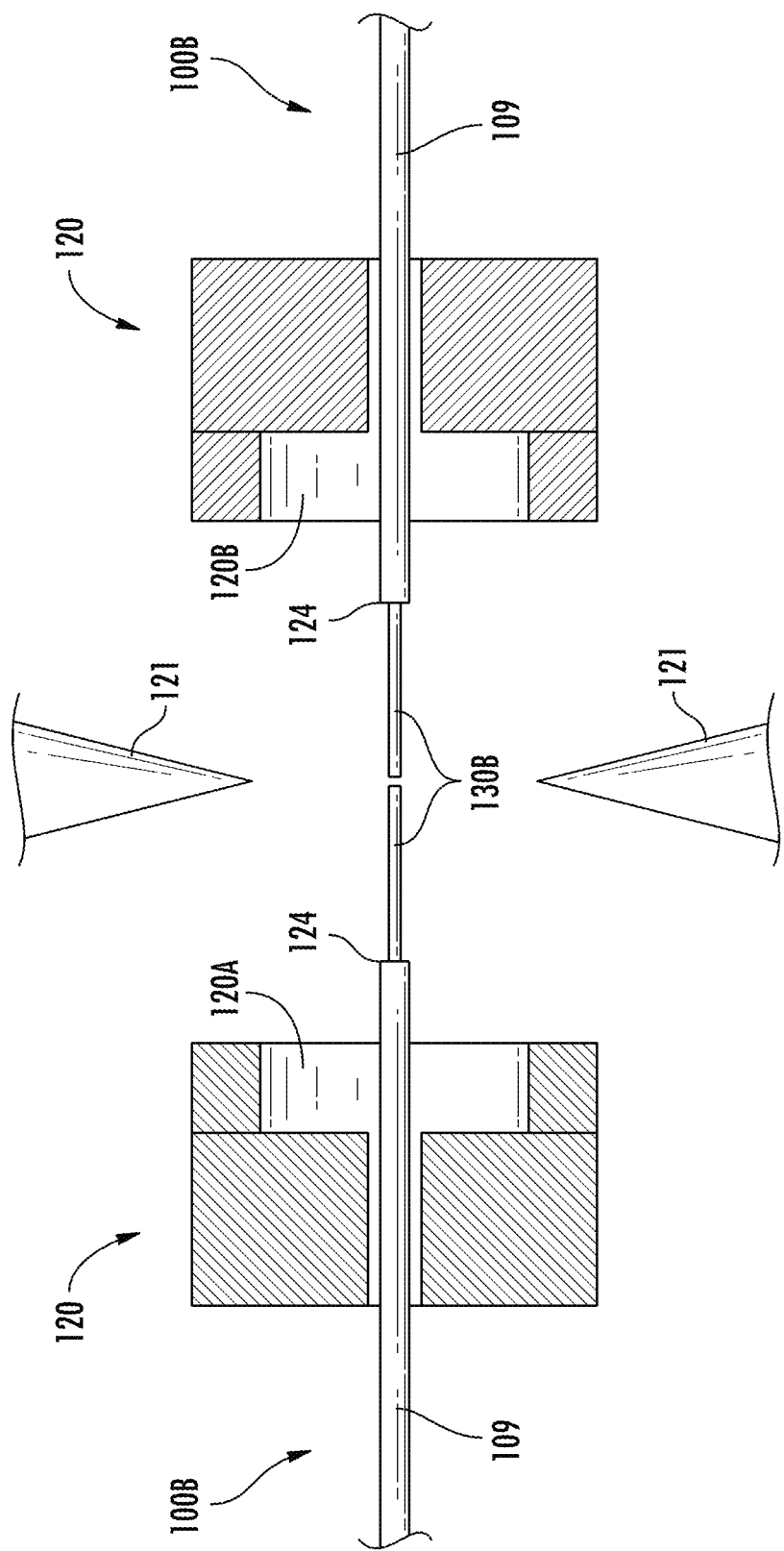
FIG. 8 is a top view of a splicer illustrating cleaving and cleaning of dual layer optical fibers in accordance with the present disclosure.

Referring now to FIG. 8, images of splicing dual layer optical fibers 1006 (FIG. 5D) are shown. As described above, optical fibers 100 are first cleaned and then directly placed on fiber cleavers (not shown). Fiber cleavers include a blade that is slightly raised to cut through outer polymer coating 109, inner polymer coating 107 (FIG. 5D), and score glass cladding 103 (FIG. 5D). Then, the portions of optical fibers 100B with unstripped inner polymer coating 107 and outer polymer coating 109 are placed on a core alignment fusion splicer 120 as shown in FIG. 8. This process is unlike standard fusion splicing processes where optical fibers 100 are stripped and cleaved prior to placement on splicer 120.

Splicer 120 includes stages 120A, 1208 upon which optical fibers 1006 rest and are aligned with each other. Once optical fibers 1006 are placed onto splicer 120, optical fibers 1006 undergo fusion arc cleaning as described below. In the first step of fusion arc cleaning, a discharge current of less than 300 ms is employed to remove dust off optical fiber 100B, and inner polymer coating 107 and outer polymer coating 109 are removed by thermo decomposition resulting in edges 124 of optical fibers 1008 as shown in FIG. 8. Stated another way, edges 124 are created by the aforementioned step where edges 124 are an end of inner polymer coating 107 and outer polymer coating 109 from which bare optical fiber 1308 (comprising glass core 101 and glass cladding 103) extends. In some embodiments, the diameter of bare optical fiber 130B is about 125 μm, and the arc current and/or arc duration is reduced. In some embodiments, current emitted by electrodes 121 is applied for a time of between about 1.5 seconds and about 2 seconds depending on the current applied. In some embodiments, after splicing bare optical fibers 130A has a splice insertion loss of between about 0.1 dB to about 0.2 dB at a reference wavelength of 1550 nm. It is within the scope of the present disclosure that in alternate embodiments, other methods may be employed to heat and fuse optical fibers 100A, 100A' such as CO2 laser, resistive heaters, or the like.

Figure 9:
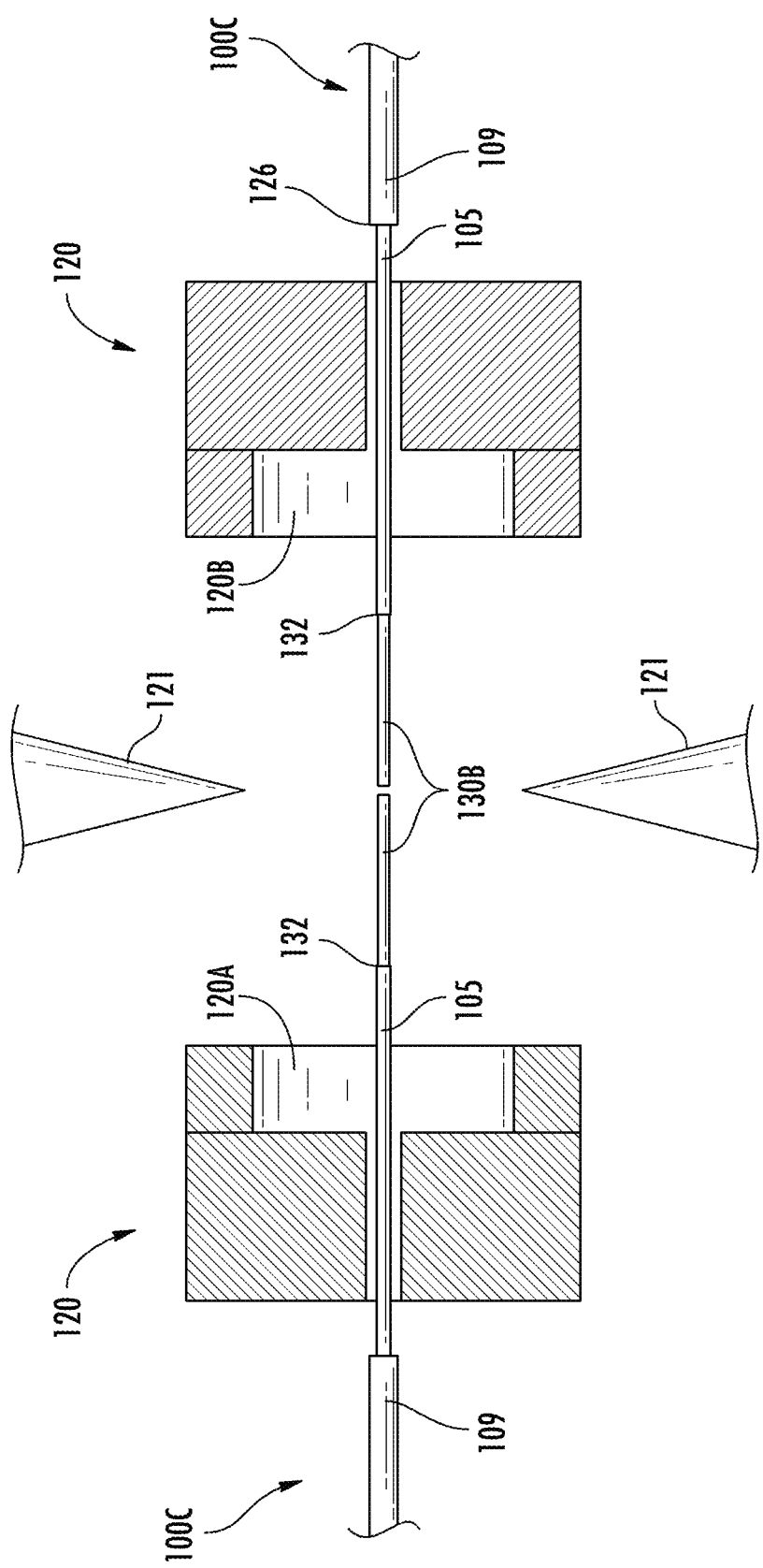
FIG. 9 is a top view of a splicer illustrating cleaving and cleaning of triple layer optical fibers in accordance with the present disclosure.

Referring now to FIG. 9, images of cleaving and splicing triple layer optical fibers 100C are shown. Inner polymer coating 107 (FIG. 5C) and outer polymer coating 109 are removed by conventional stripping equipment and corresponding conventional stripping procedures thereby defining edges 126 on each optical fiber 100C. Then, optical fibers 100C with unstripped polymer coating 105 are placed on a core alignment fusion splicer 120 as shown in FIG. 9. In particular, polymer coatings 105 of optical fibers 100C are placed on the v-grooves 120A, 120B of splicer 120. As discussed above with respect to single layer optical fibers 100A, arc cleaning (with a discharge current of 300 ms) and thermo decomposition are employed to remove a length of polymer coating 105 resulting in bare optical fibers 130C and edges 132 of polymer coating 105 as shown in FIG. 9. Then, bare optical fibers 130C can be removed from splicer 120 and can be optionally cleaned by a solvent (e.g., isopropanol or other cleaning agents) in an ultrasonic bath or a soaked wipe. Bare optical fibers 130B are then placed onto splicer 120 to continue core alignment and fusion splicing process of bare optical fibers 130C of optical fibers 100C. This process is unlike standard fusion splicing processes where optical fibers 100 are stripped and cleaved prior to placement on splicer 120.

In some embodiments, the diameter of bare optical fiber 130C is about 125 μm, and the arc current and/or arc duration is reduced. In some embodiments, current emitted by electrodes 121 is applied for a time of between about 1.5 seconds and about 2 seconds depending on the current applied. In some embodiments, after splicing bare optical fibers 130C has a splice insertion loss of between about 0.1 dB to about 0.2 dB at a reference wavelength of 1550 nm. In some embodiments, after splicing bare optical fibers 130C has a splice insertion loss of less than 0.05 dB at a reference wavelength of 1550 nm. It is within the scope of the present disclosure that in alternate embodiments, other methods may be employed to heat and fuse optical fibers 100A, 100A' such as CO2 laser, resistive heaters, or the like.

Figure 11:
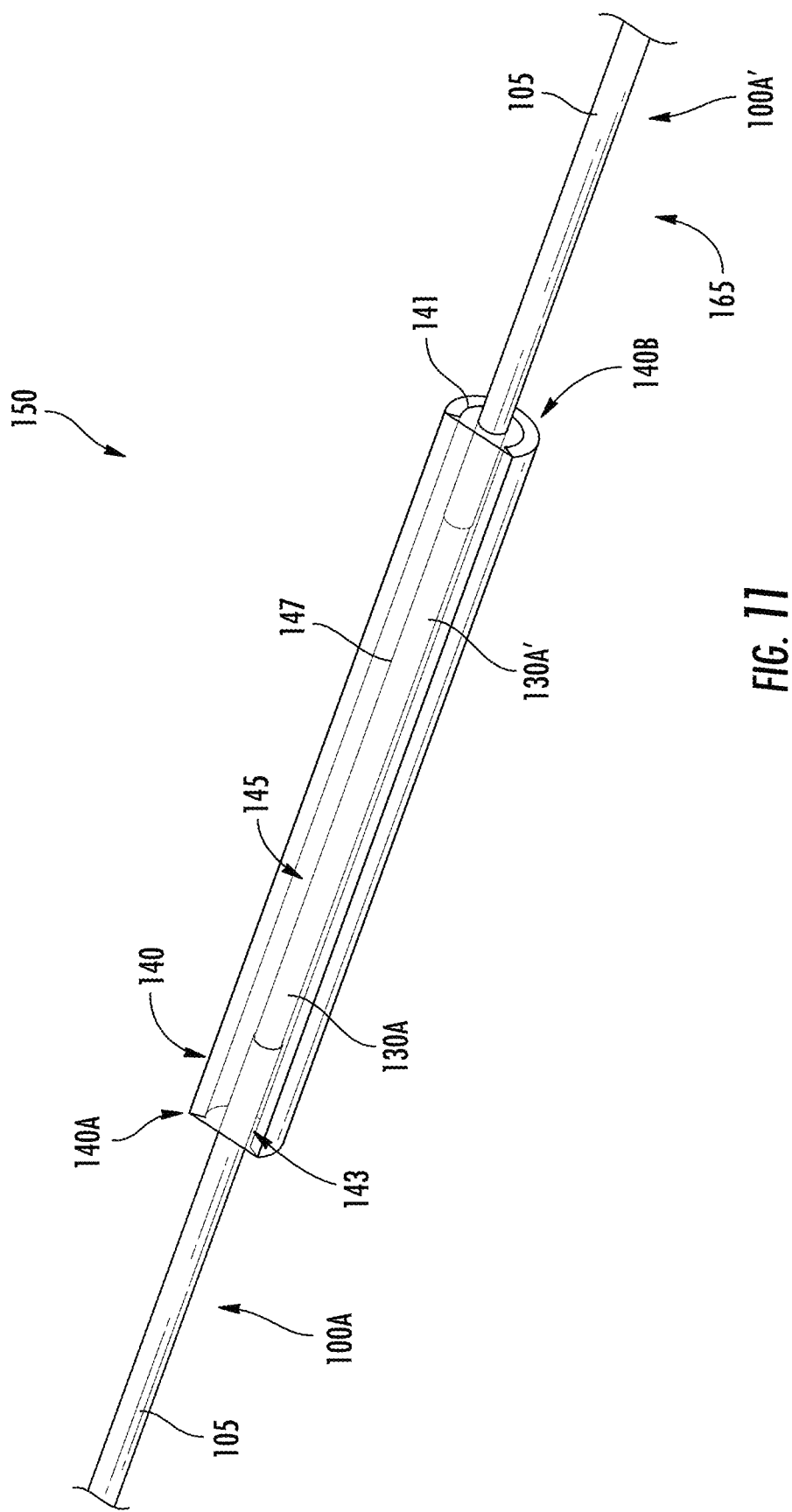
FIG. 11 is a perspective view of the cable assembly of FIG. 10 with a thermoplastic material placed within the splice protector.

Referring now to FIGS. 10 and 11, a spliced cable assembly 150 is shown. Spliced cable assembly 150 comprises a first single layer optical fiber 100A and a second single layer optical fiber 100A' that are fusion spliced together at a splice joint 134. In particular, ends of bare optical fibers 130A, 130A' are fusion spliced at a splice joint 134 to form a fusion spliced optical fiber 160. As shown in FIG. 10, optical fiber 100A and optical fiber 100A' have the same number of layers on optical fiber 100, but may differ in respective cladding 103 and polymer coating 105 diameters. In some embodiments, optical fibers 100A, 100A' have cladding 103 and polymer coating 105 diameters that are substantially the same as shown in FIG. 11. In some embodiments, fusion spliced optical fiber 160 includes a solid overcoating 136 of thermoplastic hotmelt material that extends over the splice joint 134, the previously stripped sections 130A, 130A', and short lengths of the polymer coating 105 of optical fibers 100A, 100A'. In some embodiments, solid overcoating 136 may include tapered thickness ends with a remainder of the solid overcoating 136 having a substantially constant outer diameter that exceeds an outer diameter of the polymer coating 105. Polymer coating 105 of optical fibers 100A, 100A' may each have a nominal outer diameter of 0.25 mm (250 μm) in some embodiments. In certain embodiments, the solid overcoating 136 of thermoplastic hotmelt material may include an outer diameter in a range of from 0.2 mm to 0.9 mm, from 0.2 mm to mm, from 0.2 mm to 0.5 mm, from 0.25 mm to 0.9 mm, from 0.25 mm to 0.7 mm, or from mm to 0.5 mm.

Figure 13A:
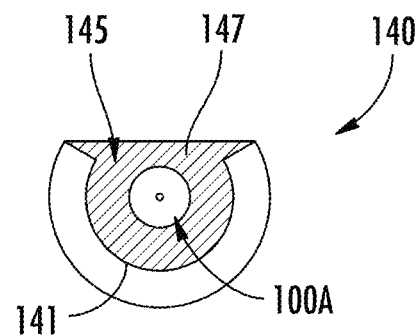
FIGS. 13A and 13B are cross sectional views of the splice protector of FIGS. 10 and 11 and the conventional splice protector of FIG. 12, respectively.

Referring back to FIG. 10, splice joint 134 is housed within a splice protector 140. As shown, splice protector 140 has a length L and extends beyond bare optical fibers 130A, 130A' to cover a portion of polymer coatings 105. In particular, length L of splice protector 140 comprises a first length L1, a second length L2, and a third length L3. Lengths L1 and L3 represent lengths of splice protector 140 that cover respective portions of polymer coatings 105 of optical fibers 100A, 100A', and length L2 represents a length of splice protector 140 that covers bare optical fibers 130A, 130A' and splice joint 134 of fusion spliced optical fiber 160. In some embodiments, lengths L1 and L3 range between about 0.1 mm and about 1 mm. In some embodiments, length L2 ranges between about 3 mm and about 5 mm or between about 3.5 mm and about 4 mm. In some embodiments, length L is between about 3.5 mm and 4 mm or at least the length of the stripped portions/bare optical fibers 130A, 130A' of fusion spliced optical fiber 165. Referring briefly to FIG. 13A, splice protector 140 has a width W that is substantially consistent along length L of splice protector 140. In some embodiments, width W is at least 0.25 mm to accommodate a standard fiber coating. In some embodiments, splice protector 140 is made of materials including stainless steel, alloy, glass, or ceramics. However, it is contemplated that in alternate embodiments, other suitable materials may be used.

Splice protector 140 has at least one wall 141 arranged in a tubular shape with a longitudinal opening 143 (e.g., a slot) extending through an entire thickness of the at least one wall 141 to permit passage of a coated optical fiber into an inner cavity 145 of splice protector 140. In certain embodiments, splice protector 140 comprises a single wall that is bent into a curved (e.g., cylindrical or oval) cross-sectional shape. In certain embodiments, an exterior of splice protector 140 comprises a generally cylindrical shape, and the inner cavity 145 of splice protector 140 also comprises a generally cylindrical shape. In certain embodiments, an exterior and/or an inner cavity 145 of splice protector 140 may comprise a cross-sectional profile that is polygonal (e.g., triangular, rectangular, square, pentagonal, hexagonal, heptagonal, octagonal, etc.) or rounded polygonal in shape. In other certain embodiments, splice protector 140 comprises a single wall 141 that is formed into a U-shaped structure. In certain embodiments, the wall thickness of splice protector 140 may be less than 2 mm or less than 1 mm. In certain embodiments, the wall thickness of splice protector 140 is 0.7 mm. In certain other embodiments, splice protector 140 is U-shaped and is formed from a sheet metal with a wall 141 thickness of 0.15 mm and an inner cavity 145 thickness of 0.40 mm. As can be appreciated, a tubular shape can have different cross-sectional profiles depending on the embodiment. In this disclosure, "tubular shape" merely refers to a shape that is generally elongate (i.e., longer than wide) and has an inner cavity. In certain embodiments, such a shape may have a cross-sectional profile of any suitable configuration, such as round, oval, square, polygonal, etc.

Following fabrication of splice protector 140, thermoplastic hotmelt material 147 may be loaded into an inner cavity 145 of splice protector 140 using any suitable methods as shown in FIG. 11. Such methods may include: injecting/dispensing molten thermoplastic hotmelt material 147 through the longitudinal opening and/or open ends of the strength member; pressing a length of solid thermoplastic hotmelt material 147 into one or more open ends 140A, 140B of splice protector 140 into the internal cavity; combinations of the foregoing; or any other suitable method. In certain embodiments, splice protector 140 is U-shaped, and thermoplastic hotmelt material 147 occupies a portion of inner cavity 145 volume. In certain other embodiments, thermoplastic hotmelt material 147 occupies a portion of inner cavity 145 volume and extends beyond longitudinal opening 143 of splice protector 140, wherein upon insertion of the optical fiber(s) 100 or optical fiber ribbon into inner cavity 145 of splice protector 140 and thermoplastic hotmelt material 147, thermoplastic hotmelt material 147 encloses the optical fiber(s) 100 or optical fiber ribbons and fills the entire volume of inner cavity 145 as discussed herein.

Referring back to FIG. 11, a perspective view of splice protector 140 including thermoplastic hotmelt material 147 in an inner cavity 145 of splice protector 140, and with end portions 145A, 145B of the thermoplastic hotmelt material 147 extending onto a portion of coated optical fibers 102A, 102B. In certain embodiments, each end portion 145A, 145B extend onto a portion of coated optical fibers 102A, 102B by at least 1 mm to provide strain relief to optical fibers portions extending beyond splice protector 140. In some embodiments, splice protector 140 includes wall 141 defining the inner cavity 145, with thermoplastic hotmelt material 147 filling substantially an entirety of the inner cavity 145 but not extending into a longitudinal opening 143 of splice protector 140. The inner surface 86 of splice protector 140 bounds inner cavity 145, wherein each of splice protector 140 and inner cavity 145 has a substantially cylindrical shape.

In some embodiments, splice protector 140 has thermoplastic hotmelt material 147 filling less than an entirety of inner cavity 145 and not extending into a longitudinal opening 143 of splice protector 140. As mentioned previously, in certain embodiments, the splice protector is U-shaped, and the thermoplastic hotmelt material occupies a portion of the inner cavity volume. In certain other embodiments, the thermoplastic hotmelt material occupies a portion of the inner cavity volume and extends beyond the longitudinal opening of the strength member of the splice protector, wherein upon insertion of the optical fiber(s) or optical fiber ribbon into the inner cavity of the strength member and the thermoplastic hotmelt material, the thermoplastic hotmelt material encloses the optical fiber(s) or optical fiber ribbons and fills the entire volume of the inner cavity.

Splice protector 140 may be prepared for protecting fusion spliced optical fibers by heating splice protector 140 sufficiently to cause thermoplastic hotmelt material 147 to be in a flowable state, so that fusion spliced optical fibers 160 inserted through the longitudinal opening 143 into inner cavity 145 may be encapsulated within the thermoplastic hotmelt material 147. Upon insertion of fusion spliced optical fibers 160 into inner cavity 145 with thermoplastic hotmelt material 147 in a flowable (e.g., molten) state, a portion of thermoplastic hotmelt material 147 may be displaced into or through longitudinal opening 143 and/or ends 140A, 140B of splice protector 140. The amount of thermoplastic hotmelt material 147 to be displaced will depend on factors such as the volume of fusion spliced optical fibers 160 inserted into inner cavity 145, the volume of thermoplastic hotmelt material 147 originally present in inner cavity 145, and the volume of any overcoating material (e.g., thermoplastic hotmelt overcoating material) that may be present on fusion spliced optical fibers 160 at the time fusion spliced optical fibers 160 are inserted into inner cavity 145. These factors may be adjusted to ensure that fusion spliced optical fibers 160 within inner cavity 145 are fully encapsulated by the thermoplastic hotmelt material 147 and provide a desired degree of filling of the inner cavity 145 and/or displacement of thermoplastic hotmelt material 147 from the longitudinal opening 143 and/or ends of splice protector 140. Excessive outflow of thermoplastic hotmelt material 147 from the inner cavity 145 may be prevented by controlling temperature of the thermoplastic hotmelt material 147 so that surface tension between the thermoplastic hotmelt material 147 and surfaces of splice protector 140 will retain the thermoplastic hotmelt material 147 in contact with splice protector 140. In certain embodiments, thermoplastic hotmelt material 147 fills 85% to 100% of a volume of the inner cavity 145 of splice protector 140 prior to insertion of at least one coated optical fiber 100A into inner cavity 145.

In an alternate embodiment, splice protector 140 may be substantially U-shaped. A method of manufacturing splice protector 140 that is a U-shaped is discussed below. A U-shaped splice protector 140 can be formed by a metal stamping process. In some embodiments, the metal stamping process yields a U-shaped splice protector 140 with flared ends (i.e., longitudinal sides of splice protector 140 are not substantially parallel to each other). In other embodiments, a shim on both sides of splice protector 140 may be used to press the sides, creating substantially parallel longitudinal sides and setting the height of inner cavity 145.

Additional details of the structure of splice protector 140 can be found in U.S. patent application Ser. No. 17/205,717, the disclosure of which is hereby incorporated by reference.

Figure 12:
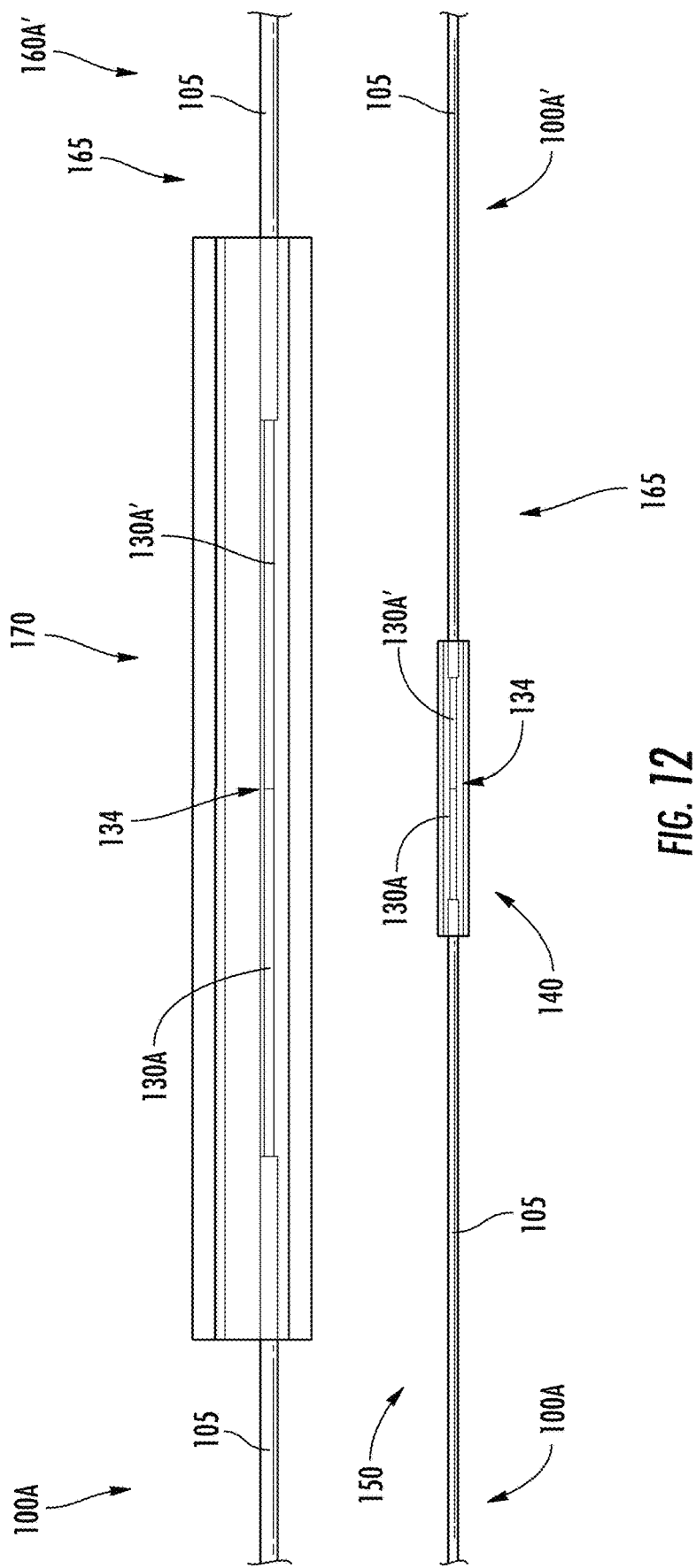
FIG. 12 is a comparison of the splice protector of FIGS. 10 and 11 with a conventional splice protector.
Figure 13B:
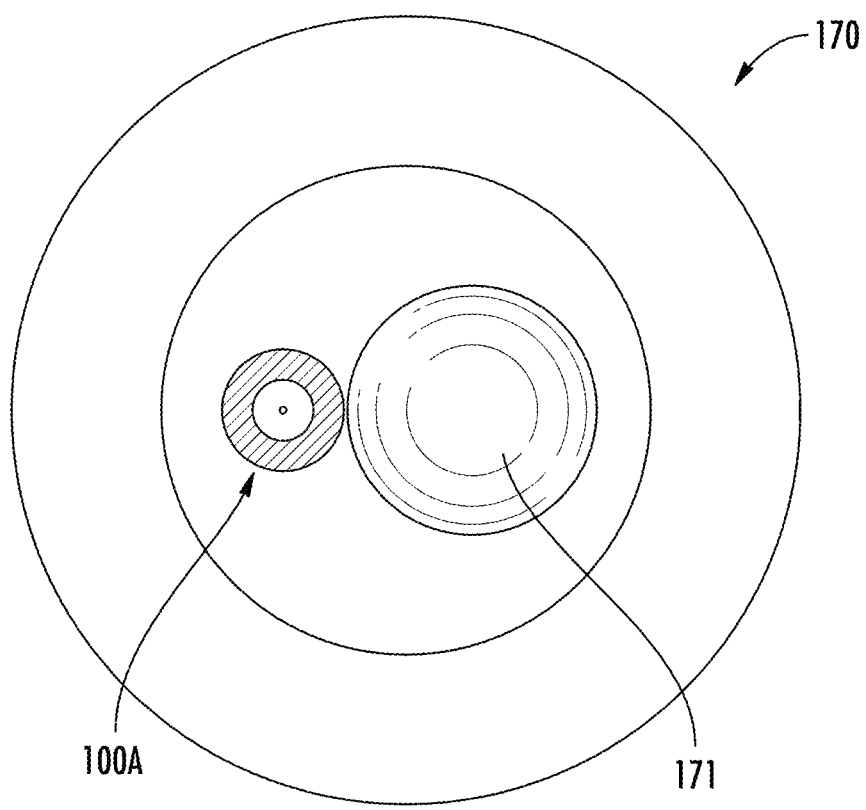

Referring now to FIGS. 12 and 13A, 13B, a comparison of a conventional splice protector 170 and splice protector 140 is shown. As shown, the length of a conventional splice protector 170 is longer than splice protector 140. Conventional splice protectors 170 have a length LC that typically ranges between 15 mm and about 40 mm. By contrast, splice protector 140 has a length L of between about 3 mm and about 5 mm or between about 3.5 mm and about 4 mm. In addition, conventional splice protectors 170 include a strength member 171 within conventional splice protector 170, which increases the size of conventional splice protector 170 as shown in FIG. 13B.

The dimensions of splice protector 140 enable mechanical advantages of splice protector 140 compared to conventional splice protectors. Also, in some embodiments, cable assembly 150 having a splice protector 140 with spliced optical fiber 160 has a macrobend loss of less than 0.01 dB or less than 0.001 dB at a reference wavelength of 1550 nm at a mandrel radius of about 15 mm. In some embodiments, cable assembly 150 having a splice protector 140 with spliced optical fiber 160 has a macrobend loss of less than 0.01 dB or less than 0.001 dB at a reference wavelength of 1550 nm at a mandrel radius of about 10 mm. In some embodiments, cable assembly 150 having a splice protector 140 with spliced optical fiber 160 has a macrobend loss of less than 0.01 dB or less than 0.001 dB at a reference wavelength of 1550 nm at a mandrel radius of about 7.5 mm. Advantageously, the macrobend properties of splice protector 140 enable cable assembly 150 to have greater flexibility properties and therefore, a greater packing efficiency of cable assemblies 150 with splice protectors 140 can be achieved in various applications such as small modules or enclosures. Stated another way, cable assemblies 150 with splice protector 140 enables greater fiber routing in smaller enclosures (e.g., small modules, enclosures, etc.) without requiring use of a high grade bend insensitive optical fiber.

Example

Figure 14:
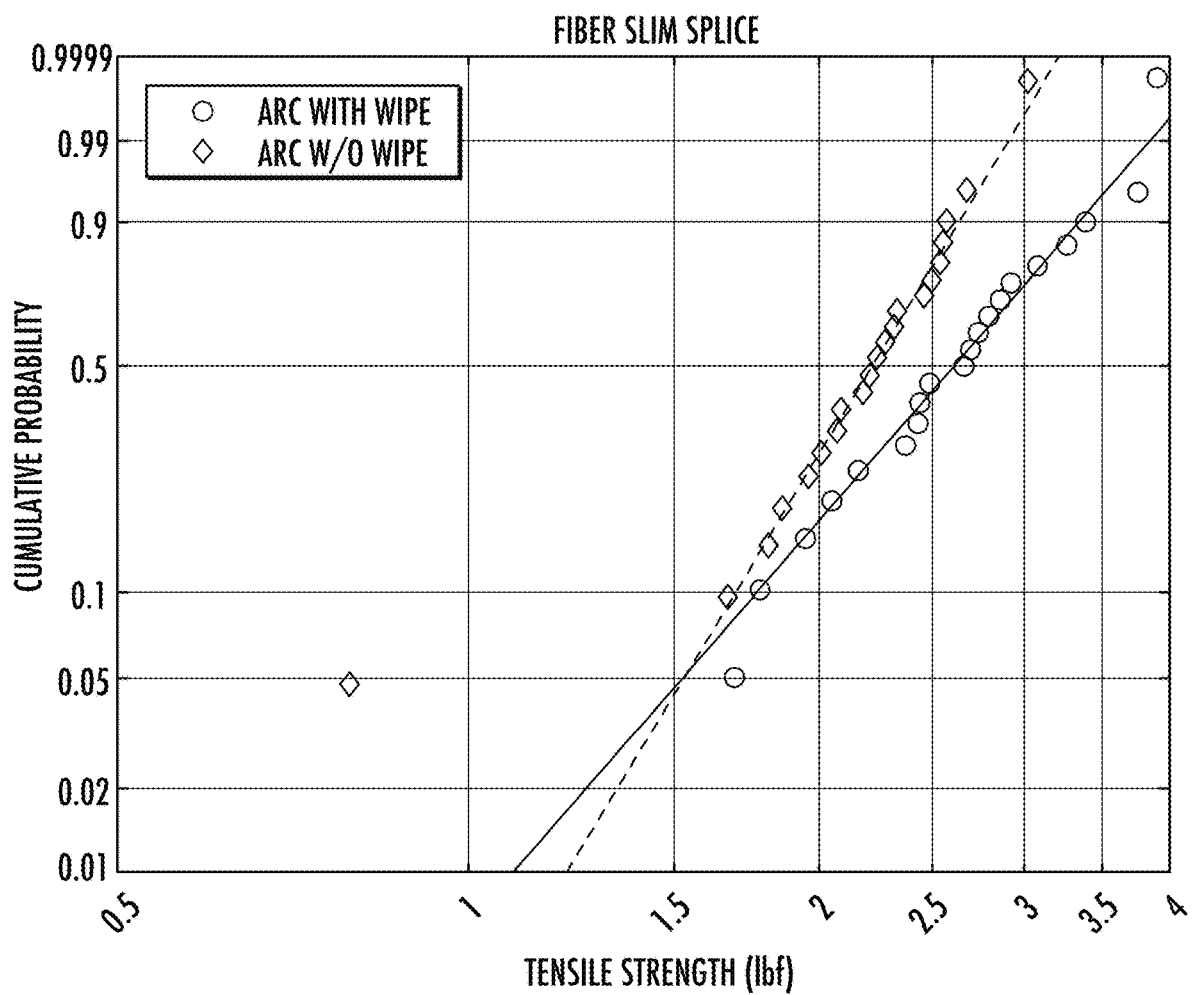
FIG. 14 relates to the Example and provides a graph illustrating tensile strength of fusion spliced optical fibers of the present disclosure.

Two single layer thin coated optical fibers (e.g., optical fibers 100) with a cladding diameter of 115 µm and a coating diameter of 125 µm undergo the splicing process as described above and are placed within a splice protector (e.g., splice protector 140) as described above. Polymer coating 105 reduces damage to optical fiber 100 when optical fiber 100 undergoes arc stripping as described in the present disclosure. Referring now to FIG. 14, tensile strength of thin coated fiber splices with and without cleaning after the arc stripping process are compared. As shown, a minimum tensile strength of about 1.7 lbf for both types of optical fibers 100 (cleaned and uncleaned) is exhibited. Such a minimum tensile strength is sufficient for handling optical fibers 100 when the splice joint 108 is housed inside a module or enclosure.

Figure 15:
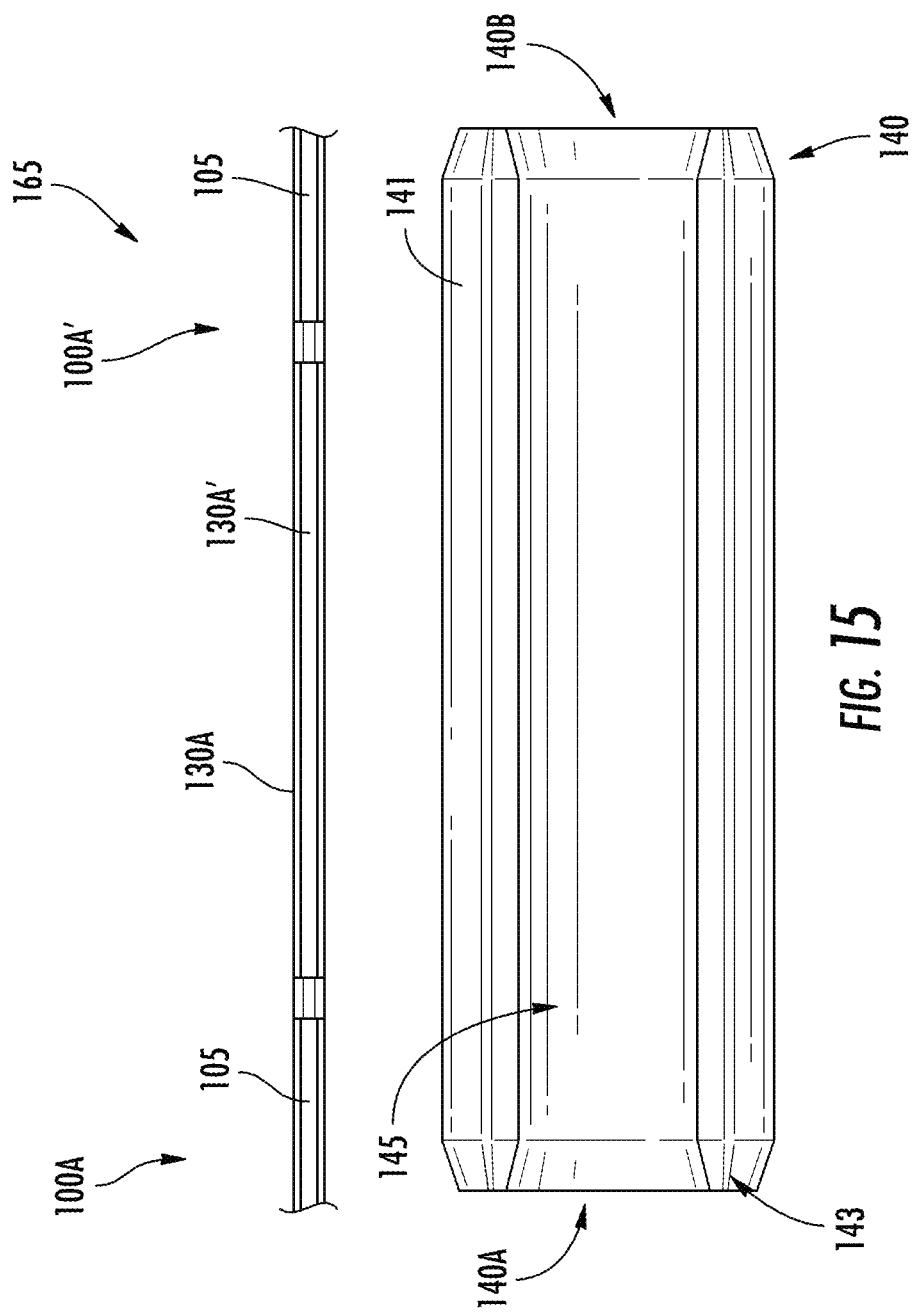
FIG. 15 relates to the Example and provides perspective views of a fusion spliced optical fiber and a splice protector of the present disclosure.

The arc stripped fibers are fusion spliced with a total exposed cladding length (e.g., bare optical fiber 130A, 130A') of about 3 mm As shown in FIG. 15, the edges of the coatings can have slight charring of coating 105, which has a width of about 150 µm. To cover the splice joint with such a short strip length, a standard stainless steel roll pin (e.g., splice protector 140) is used which has a length L of 4 mm, an outer diameter of 1.2 mm and a wall thickness of 0.2 mm.

Figure 16:
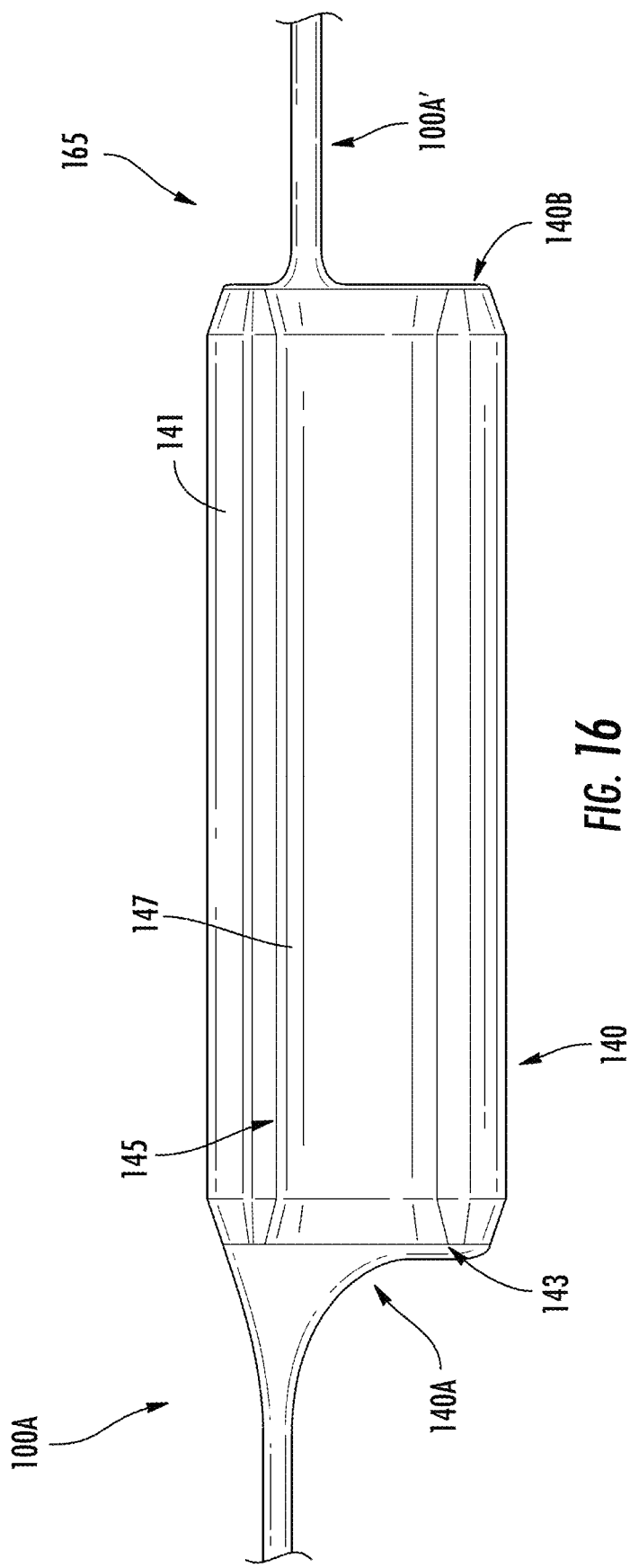
FIG. 16 relates to the Example and provides a perspective view of a cable assembly having the fusion spliced optical fiber of FIG. 15 within the splice protector of FIG. 15.

The splice protectors are pre-made by heating the roll pins and filling the inner cavities of the roll pins with a thermoplastic (PA682 hot melt thermoplastic). The splice protectors are stored in an airtight container. When in use, a splice protector is placed in a small heating block to raise its temperature to the operating melt flow temperature of the thermoplastic material (about 200° C.). The spliced fiber is straightly disposed into the molten thermoplastic in the inner cavity of the splice protector, which is then allowed to cool to room temperature. The fiber splice alignment is maintained (i.e., kept straight) without the cladding contacting the wall or edges of the splice protector. The solidified thermoplastic material encapsulates the splice and stripped cladding in the inner cavity of the splice protector, as shown in FIG. 16. A small amount of hot melt thermoplastic extends outside the strength member to form strain relief. The splice protector can accommodate multiple fiber splices.

Figure 17:
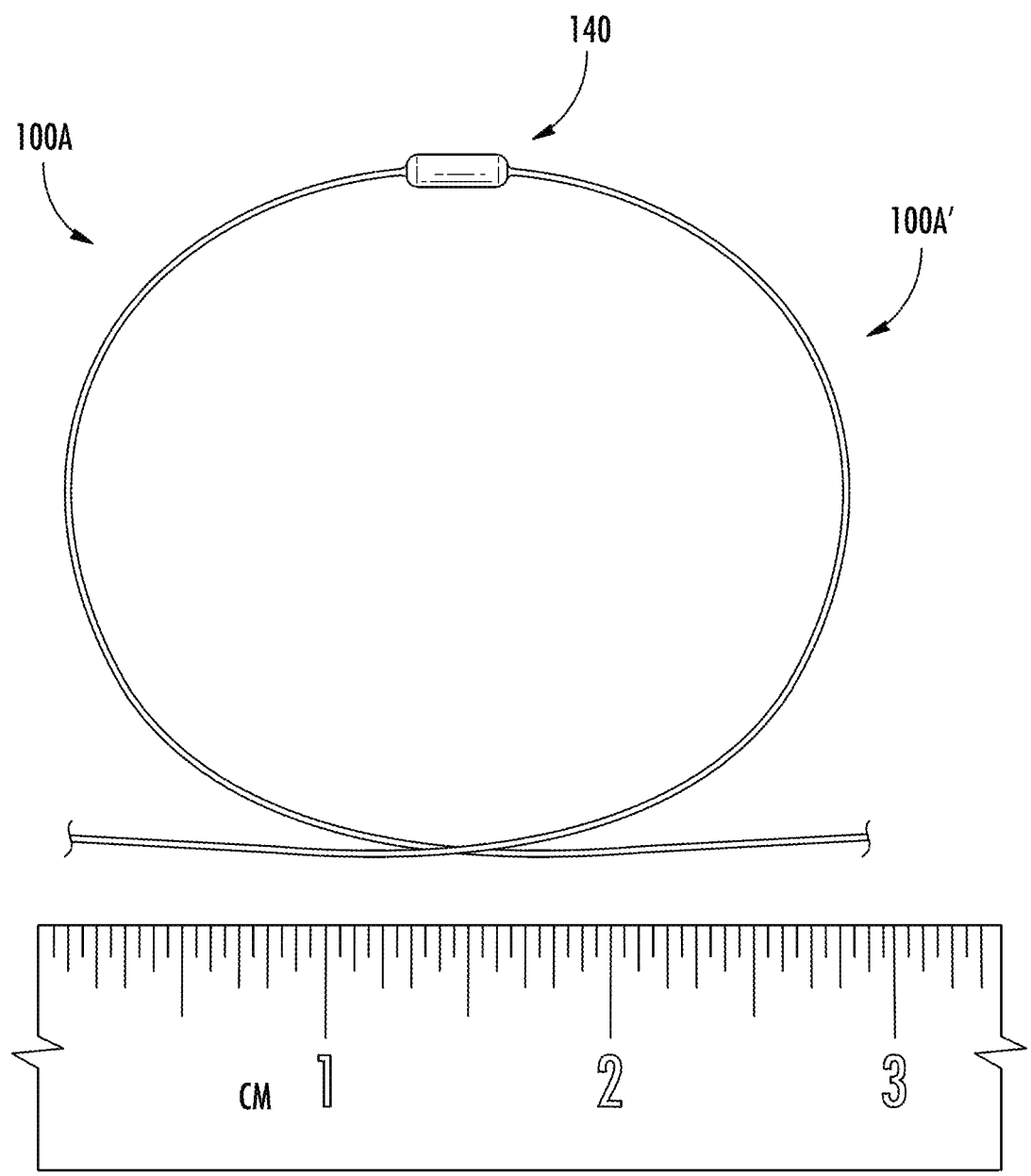
FIG. 17 relates to the Example and illustrates the bending properties of the cable assembly of FIG. 16.
Figure 18A:
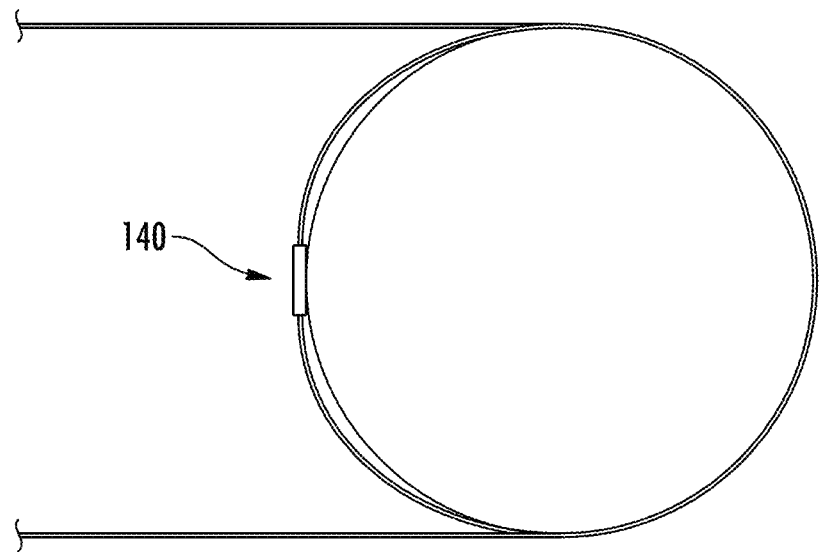
FIGS. 18A and 18B are side views illustrating the bending properties of the cable assembly of FIG. 16 and a conventional cable assembly, respectively, around a mandrel.
Figure 18B:
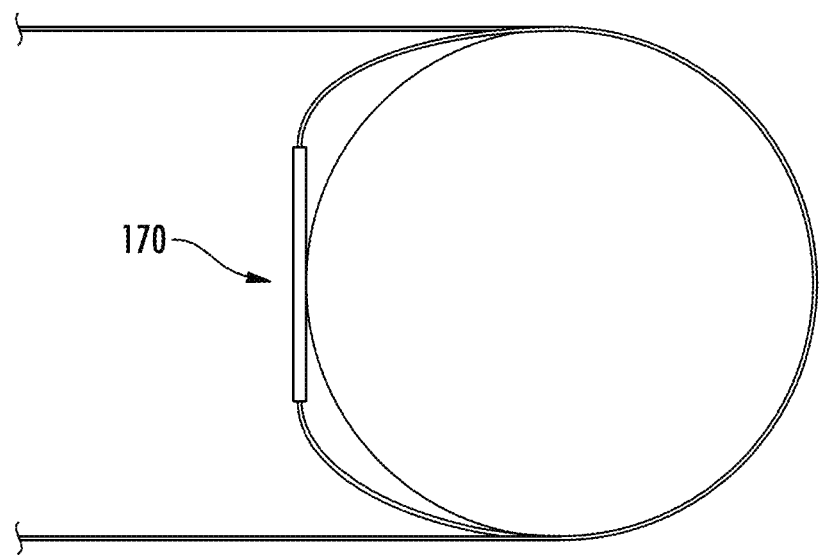

Referring now to FIG. 17, the spliced fiber coiled into a 30 mm diameter loop is shown. As can be seen, with the short length of the splice protector, the splice protector blends into the coil and can be placed anywhere in the loop. To quantify the benefit of a shorter splice protector length, FIGS. 18A, 18B show spliced fiber wound on a 30 mm diameter mandrel. The fiber path from the edge of the splice protector to the top or bottom point of the mandrel can be approximated by a quarter ellipse, which has a minor axis length is given by R–L/2, where R is the radius of the mandrel and L the length of the splice protector, and the major axis length is R.

The thin coated fiber has the same index profile as that of a single mode optical fiber manufactured by Corning Incorporated, which exceeds the bending performance of G.657.A1 standard. The macro bend loss at 1550 nm can be expressed as a function of local bend radius r as shown in Equation (1) below:

$$l(r) = 2.359 \times 10^{-9} \exp\left(\frac{150.3}{r}\right) \quad (1)$$

Figure 19:
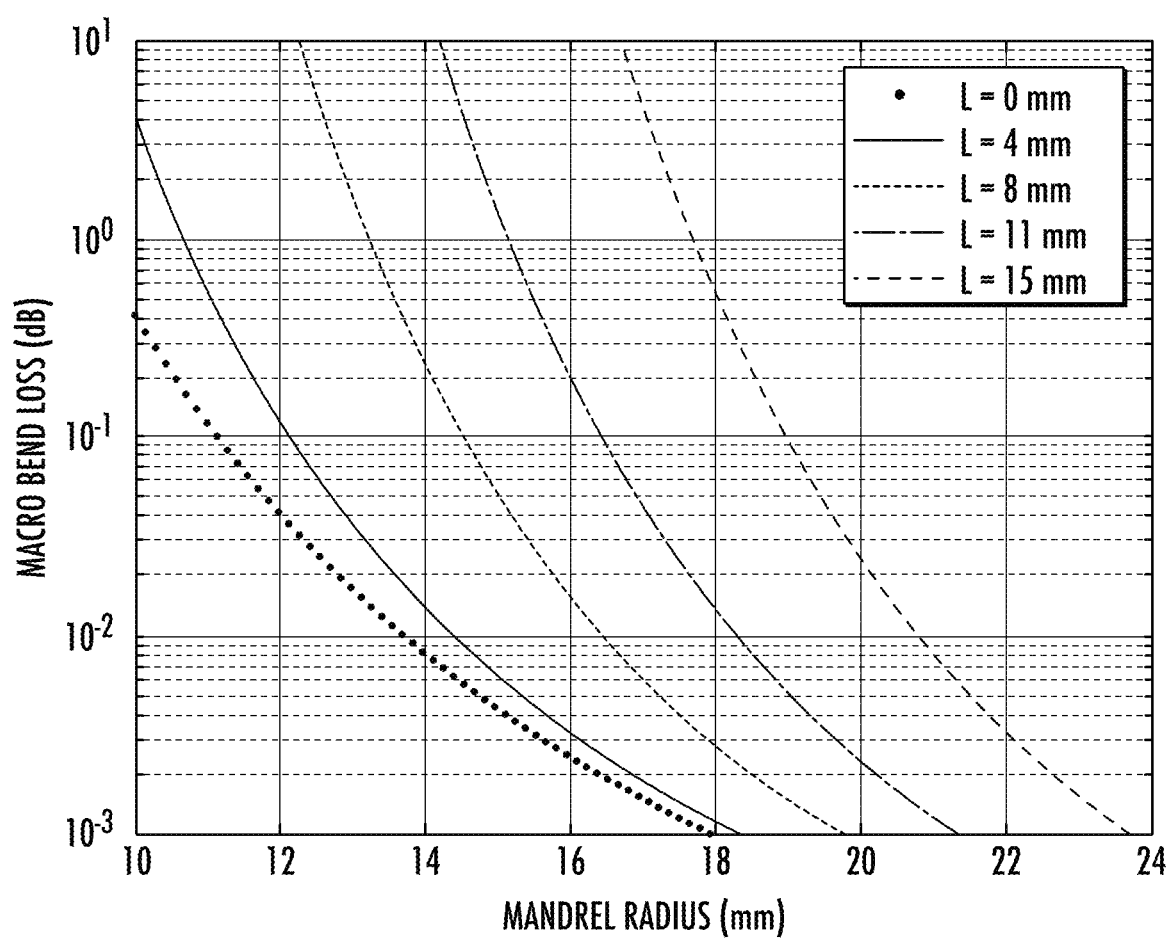
FIG. 19 relates to the Example and provides a graph illustrating macrobend loss of cable assemblies of the present disclosure.

By integrating the differential macro bend loss along the ellipse and semi-circular paths of the fibers in mandrel, the simulated total macro bend loss as a function of mandrel radius at various splice protector lengths is summarized in FIG. 19.

As shown in FIG. 19, with a 4 mm long splice protector, the increase of macro bend loss is small compared to winding a non-spliced fiber in the same mandrel. Also, a 15 mm mandrel radius yields a macro bend loss of less than 0.01 dB at a reference wavelength of 1550 nm for splice protectors of all lengths shown. At longer splice protector lengths, the macro bend loss become significant as shown. For example, a 15 mm long splice protector creates more than 10 dB of macro bend loss at a reference wavelength of 1550 nm at the same mandrel radius. In such instances, to mitigate the loss would require the use of bend insensitive optical fibers, which are more expensive. As such, FIGS. 18A, 18B, and 19 illustrate advantageous properties of the short splice protector—i.e., enabling spliced fiber routing in a tight space without using expensive high grade bend insensitive optical fiber. Thus, the routable short splice protector is advantaged when used in small modules or enclosures.

There are many variations of the embodiments disclosed herein. For instance, standard dual coated fibers can be mid-span stripped using a high strength non-contact process to expose the cladding, and then a thin layer of hard coating is applied to the cladding. The local single layer hard coated optical fiber can be processed in the same way as the thin coated optical fiber splicing as described herein. During or after the application of the short splice protector to the fiber splice, the exposed single layer hard coating may be augmented with a thicker layer of hot melt coating to obtain a comparable bend modulus as the rest of the optical fiber. The short splice protector can combine with strongly bend insensitive hard coated optical fiber to be used with smaller coil radii. Multiple splices can be protected in the same splice protector.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. An optical fiber assembly comprising:
   a first optical fiber and a second optical fiber each including a pre-coated section and a stripped section;
   a fusion splice including a splice joint joining an end of the stripped section of the first optical fiber with an end of the stripped section of the second optical fiber to form a fusion spliced optical fiber having a longitudinal axis; and
   a splice protector surrounding the splice joint, the splice protector including at least one wall arranged in a tubular shape having a central axis extending in a longitudinal direction, wherein the splice protector is bend-resistant, the at least one wall bounds an inner cavity extending in the longitudinal direction, and a longitudinal opening extends through an entire thickness of the at least one wall to permit passage of the pre-coated section of the first optical fiber or the pre-coated section of the second optical fiber into the inner cavity; and
   wherein the splice protector has a length in the longitudinal direction of between about 3 mm and about 5 mm.

2. The optical fiber assembly of claim 1, wherein the splice protector has a length in the longitudinal direction of about 3.5 mm.

3. The optical fiber assembly of claim 1, further comprising a thermoplastic hotmelt material present in the inner cavity of the splice protector to encapsulate the splice joint as well as at least the stripped sections of the first and second optical fibers.

4. The optical fiber assembly of claim 1, wherein at least one of the first optical fiber and the second optical fiber comprise a glass core, a glass cladding surrounding the glass core, and a polymer coating surrounding the glass core and the glass cladding, wherein the polymer coating has a pencil hardness greater than 3H on Polymethylmethacrylate (PMMA) film.

5. The optical fiber assembly of claim 4, wherein the polymer coating has a modulus of elasticity between 0.1 GPa and 3 GPa.

6. The optical fiber assembly of claim 1, wherein at least one of the first optical fiber and the second optical fiber comprises a glass core, a glass cladding surrounding the glass core, a polymer coating surrounding the glass core and the glass cladding, an inner polymer coating surrounding the glass core and the glass cladding, and an outer polymer coating surrounding the inner polymer coating.

7. An optical fiber cable assembly comprising:
   a first optical fiber and a second optical fiber each including a pre-coated section and a stripped section;
   a fusion splice including a splice joint joining an end of the stripped sections of the first optical fiber with an end of the stripped section of the second optical fiber to form a fusion spliced optical fiber; and
   a splice protector surrounding the splice joint, the splice protector including at least one wall arranged in a tubular shape having a central axis extending in a longitudinal direction, wherein the splice protector is bend-resistant, the at least one wall bounds an inner cavity extending in the longitudinal direction, and a longitudinal opening extends through an entire thickness of the at least one wall to permit passage of a pre-coated section of a fusion spliced optical fiber into the inner cavity; and wherein the optical fiber cable assembly has a macrobend loss of less than 0.01 dB at a wavelength of 1550 nm and at a mandrel radius of 15 mm;

wherein the splice protector has a length in the longitudinal direction of between about 3 mm and about 5 mm.

8. The optical fiber cable assembly of claim 7, wherein the optical fiber cable assembly has a macrobend loss of less than 0.01 dB at a wavelength of 1550 nm and at a mandrel radius of 10 mm.

9. The optical fiber cable assembly of claim 7, wherein the optical fiber cable assembly has a macrobend loss of less than 0.01 dB at a wavelength of 1550 nm and at a mandrel radius of 7.5 mm.

10. The optical fiber cable assembly of claim 7, wherein the splice joint has an insertion loss of less than 0.05 dB at a reference wavelength of 1550 nm.

11. The optical fiber cable assembly of claim 7, wherein the splice protector is made of stainless steel, alloy, glass, or ceramic.

12. The optical fiber assembly of claim 7, wherein at least one of the first optical fiber and the second optical fiber comprise a glass core, a glass cladding surrounding the glass core, and a polymer coating surrounding the glass core and the glass cladding, wherein the polymer coating has a pencil hardness greater than 3H on Polymethylmethacrylate (PMMA) film.

13. The optical fiber assembly of claim 7, wherein at least one of the first optical fiber and the second optical fiber comprises a glass core, a glass cladding surrounding the glass core, a polymer coating surrounding the glass core and the glass cladding, an inner polymer coating surrounding the glass core and the glass cladding, and an outer polymer coating surrounding the inner polymer coating.

* * * * *